(12) United States Patent
Ohmi et al.

(10) Patent No.: US 8,201,471 B2
(45) Date of Patent: Jun. 19, 2012

(54) GEARS AND GEARING APPARATUS

(75) Inventors: Kenji Ohmi, Kawaguchi (JP); Yasutaka Kawakami, Kawaguchi (JP)

(73) Assignee: Enplas Corporation, Kawaguchi-shi (JP)

( * ) Notice: Subject to any disclaimer, the term of this patent is extended or adjusted under 35 U.S.C. 154(b) by 314 days.

(21) Appl. No.: 12/567,672

(22) Filed: Sep. 25, 2009

(65) Prior Publication Data

US 2010/0011895 A1     Jan. 21, 2010

Related U.S. Application Data

(62) Division of application No. 11/528,651, filed on Sep. 28, 2006, now abandoned.

(30) Foreign Application Priority Data

Sep. 28, 2005 (JP) .................................. 2005-281339
Mar. 3, 2006 (JP) .................................. 2006-057621

(51) Int. Cl.
    *F16H 55/00* (2006.01)
(52) U.S. Cl. ........................................................ 74/462
(58) Field of Classification Search .................... 74/457, 74/460, 462; F16H 55/00, 55/08, 55/10
See application file for complete search history.

(56) References Cited

U.S. PATENT DOCUMENTS 2,682,760 A    7/1954   Shenk
5,946,975 A    9/1999   Yun
6,230,578 B1   5/2001   Kim et al.

FOREIGN PATENT DOCUMENTS

| CN | 1100223 C | 1/2003 |
|---|---|---|
| DE | 198 59 143 A1 | 6/2000 |
| JP | S51-144637 | 12/1976 |
| JP | S61-157748 | 9/1986 |
| JP | 3-28565 A | 2/1991 |
| JP | 3-69844 A | 3/1991 |
| JP | 8-312755 | 11/1996 |
| JP | 2002-543352 | 12/2002 |
| JP | 2005-214408 | 8/2005 |
| RU | 2074986 C1 * | 3/1997 |

* cited by examiner

*Primary Examiner* — Richard W Ridley
*Assistant Examiner* — Phillip A Johnson
(74) *Attorney, Agent, or Firm* — McDermott Will & Emery, LLP

(57) ABSTRACT

In a gear ($G_1$) according to the present invention, which is provided with a plurality of teeth (1) to be mated with teeth of a mating gear to thereby transmit a rotational motion, a predetermined region (A) in at least one tooth flank (7) of each tooth (1) is formed in a configuration such that, from at least one place in a tooth width direction on a crossing (8) of the tooth flank (7) and a tooth tip surface (3), the mating with the teeth of the mating gear is started with the point contact or the line contact shorter than the total tooth width, and thereafter, is gradually shifted to the line contact so that the length of contact line (10) thereof is sequentially increased as the line contact moves from a tooth tip surface (3) side toward a tooth root side.

4 Claims, 19 Drawing Sheets

Prior Art

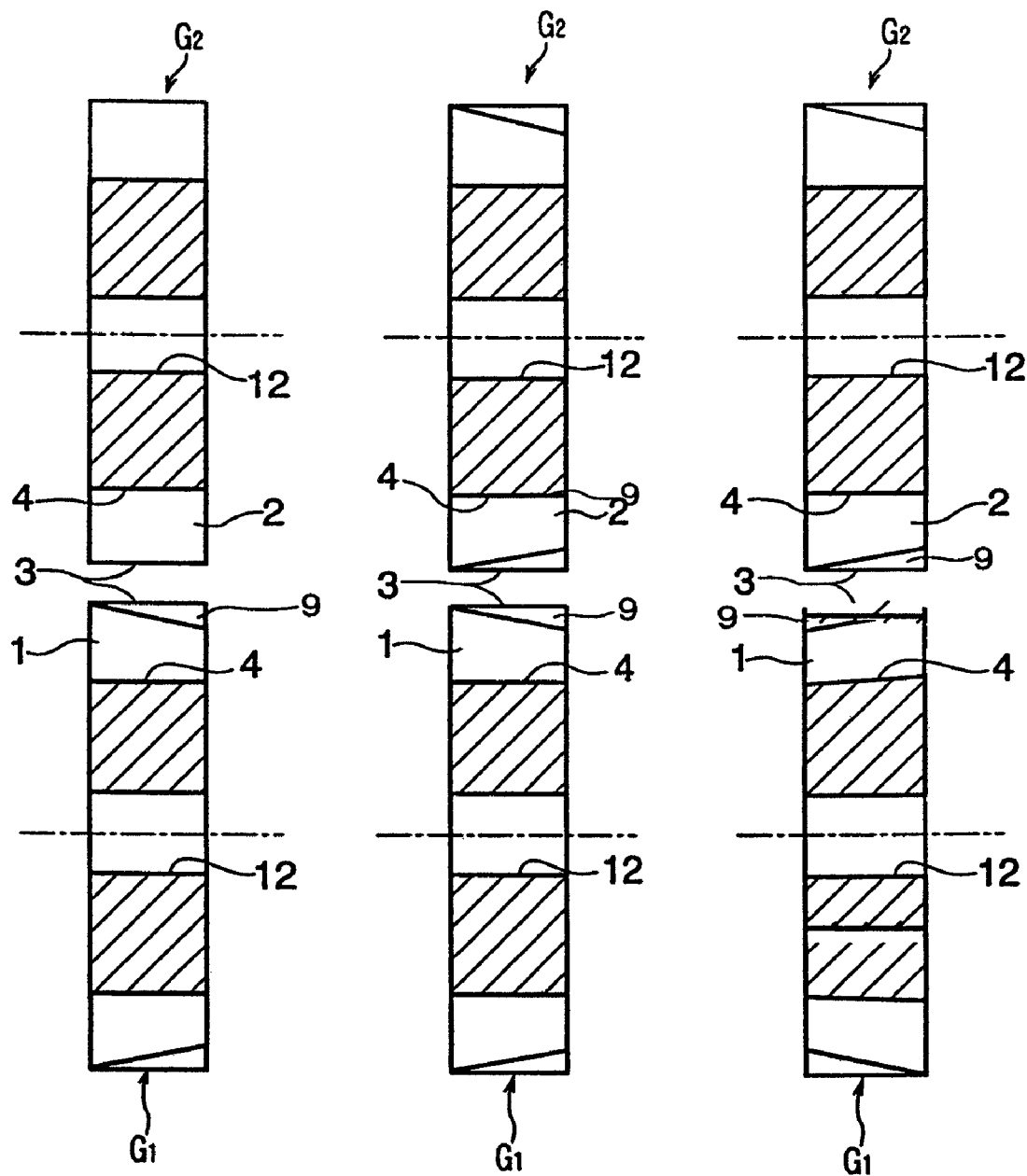

GEARS AND GEARING APPARATUS

CROSS REFERENCE TO RELATED APPLICATIONS

This application is a divisional of U.S. application Ser. No. 11/528,651, filed Sep. 28, 2006, which is hereby incorporated by reference in its entirety for all purposes.

BACKGROUND OF THE INVENTION

1. Field of the Invention

The present invention relates to gears and a gearing apparatus for transmitting a rotational motion between two associated shafts, i.e., from one to the other of two associated shafts, through a pair of gears which are engaged with each other so that teeth of the engaged gears are operatively mated with each other. More particularly, the present invention relates to gears and a gearing apparatus capable of reducing generation of noise during the rotational motion transmitting operation of a pair of gears engaged with each other, and also reducing an error in transmission of the rotational motion.

2. Description of the Related Art

As gears in a conventional gearing apparatus, typically, gears called standard gears having symmetrical tooth profiles are used. In a combination of such standard gears, the tooth tip and the tooth root of each of teeth have identical tooth widths when measured in a direction along the axes of the respective gears and the total tooth depth of each tooth is unchanged and constant in a tooth width direction. Therefore, in the case where opposite teeth are mated with each other, since an amount of change in a spring constant of a tooth which functions as a type of spring between the double-teeth-mating arrangement and the single-tooth-mating arrangement, is large, sometimes, noise due to the mating of the gear teeth becomes large and also the vibration is increased. Further, the increase in the vibration of the mated gear teeth could often cause an increase in an error in the rotation transmission of the engaged gears.

In order to cope with the above problems, there has been conventionally proposed a gearing apparatus in which a pair of gears is configured by involute spur gears and at least one gear of the pair of gears is provided with rigidity reducing means incorporated therein for reducing the rigidity in the double-teeth-mating region of the said one gear, in comparison with the rigidity to be provided by the standard involute spur gear. As this rigidity reducing means in the gear, for example, there is a through-hole formed in a gear, which runs through from one of end face of a tooth tip portion toward the other end face thereof. In this case, when opposite teeth are mated with each other, a deflection amount of the tooth is relatively increased, in comparison with a deflection amount of a tooth of the standard involute spur gear, and therefore, the fluctuation in the deflection amount in the duration of mating of the opposite teeth is suppressed and accordingly, the silence during the rotation transmission time is improved, and also, the vibration is reduced (refer to Japanese Unexamined Patent Publication No. 8-312755 (FIG. 4)).

However, in the gears of the conventional gearing apparatus, as shown in FIG. 4 of Japanese Unexamined Patent Publication No. 8-312755, although the through-hole as the rigidity reducing means runs through from the one end face of the tooth tip portion to the other end face thereof, a tooth profile of each tooth is still kept as an involute spur tooth profile, and the tooth contact at the time of mating of each tooth with each tooth of the mating gear is in a line contact state. In this case, in the mating of the opposite teeth, the line contact state is maintained from the beginning to the end in the mating, and therefore, it is impossible to appreciably reduce noise generated when the pair of gears is mated with each other. Also, it is impossible to sufficiently improve the vibration suppression at the mating time, and also, to sufficiently reduce the error in the rotation transmission of the gearing apparatus.

SUMMARY OF THE INVENTION

In view of the above problems, an object of the present invention is to provide firstly gears comprised of one and the other mutually engaged gears, and secondly a gearing apparatus capable of reducing noise generated when a pair of gears is engaged with each other and also, reducing an error in rotation transmission of the gears.

To achieve the above object, in accordance with a first aspect of the present invention, gears comprised of one and the other mutually engaged gears, each being provided with a plurality of teeth to be mated with the teeth of the other engaged gear to thereby transmit a rotational motion, wherein a predetermined region in at least one of tooth flanks of each tooth of the one gear is formed in a configuration such that mating of each tooth of the one gear with the teeth of the other engaged gear starts with either point contact or line contact shorter than a total length of a tooth width of the one gear from at least one place in a direction of a tooth width on a crossing of the tooth flank and a surface of tooth tip of the one gear and thereafter, gradually shifts to the line contact so that a length of contact line thereof is continuously increased as the line contact moves from a tooth tip side toward a tooth root side. It should be understood that the term "surface" generally includes not only a flat surface but also a surface with a curvature of unevenness throughout the description of this specification.

According to the above configuration, the predetermined region in at least one tooth flank of each tooth of the one gear is formed in the configuration such that, from at least one place in the tooth width direction on the crossing of the tooth flank and the tooth tip surface, the mating of each tooth of the one gear with the teeth of the other engaged gear starts with point contact or the line contact shorter than the total tooth width and thereafter, gradually shifts to line contact so that the length of contact line thereof is continuously increased as the line contact moves from the tooth tip side toward the tooth root side. In this case, mainly in the gear on a driven side, the contact at the mating time of the opposite teeth does not start firstly with the line contact on the tooth flank, but starts with the point contact or the line contact shorter than the total tooth width. Then, the point contact gradually moves to the line contact shorter than the total tooth width, and thereafter, further gradually moves to a longer line contact within a range of the total tooth width. Further, the line contact shorter than the total tooth width then gradually moves to the longer line contact within the range of the total tooth width. As a result, the contact to the teeth of the mating gear can be soft and therefore, the contacting shock can be absorbed. Accordingly, it is possible to reduce the generation of vibration at the mating time of the pair of gears, to thereby reduce generation of noise due to the mating. Further, by reducing the vibration, it is possible to reduce an error in transmission of rotational motion.

Further, the predetermined region in the tooth flank is chamfered. Hence, the configuration thereof is made to be an inclined plane which extends from at least one place in the tooth width direction on the crossing of the tooth flank and the tooth tip surface toward one of end faces of the tooth or both of the end faces thereof. As a result, by the shape in which the predetermined region in the tooth flank is chamfered, a portion which is not mated with the mating gear appears in the tooth flank, so that a contact area is decreased. In this case, the mating of the tooth of the one gear with the teeth of the mating gear always starts with the point contact or the line contact shorter than the total tooth width. Then, the point contact gradually moves to the line contact shorter than the total tooth width, and thereafter, further gradually moves to the larger line contact within the range of the total tooth width. Further, the line contact shorter than the total tooth width then gradually moves to the larger line contact within the range of the total tooth width. As a result, the contact to the teeth of the mating gear can be soft and therefore, the shock can be absorbed.

Furthermore, a reduced portion is formed by chipping, cutting off or the like (it will be hereinbelow referred to as a chipped portion), so that the configuration in the predetermined region in the tooth flank is made to be an inclined plane which extends from one place or a plurality of places of the tooth flank to both of the end faces of the tooth toward the crossing of the tooth flank and the tooth tip surface. As a result, by forming the chipped portion in the predetermined region in the tooth flank, the portion which is not mated with the mating gear appears in the tooth flank, so that the contact area is decreased. In this case, the mating of the tooth of the one gear with the teeth of the engaged gear starts with the point contact or the line contact shorter than the total tooth width. Then, the point contact gradually moves to the line contact shorter than the total tooth width, and thereafter, further gradually moves to the larger line contact within the range of the total tooth width. Further, the line contact shorter than the total tooth width then gradually moves to the larger line contact within the range of the total tooth width. As a result, the contact to the teeth of the mating gear is softened and therefore, the shock can be absorbed.

Still further, in the configuration of the predetermined region in the tooth flank, a curved surface which gradually decreases the tooth thickness, is formed toward the one end face of the tooth or both end faces thereof in the tooth width direction of the tooth flank. As a result, by forming the curved surface which gradually decreases the tooth thickness, in the predetermined region in the tooth flank, the portion which is not mated with the mating gear appears in the tooth flank, so that the contact area is decreased. In this case, the mating with the teeth of the mating gear starts with the point contact or the line contact shorter than the total tooth width. Then, the point contact gradually moves to the line contact shorter than the total tooth width, and thereafter, further gradually moves to the larger line contact within the range of the total tooth width. Further, the line contact shorter than the total tooth width then gradually moves to the larger line contact within the range of the total tooth width. As a result, the contact to the teeth of the mating gear can be soft and therefore, the shock can be absorbed.

Moreover, the predetermined region in the tooth flank is a region on the tooth tip side from the vicinity of a branching point between the (n+1) teeth mating and the n teeth mating (n is integer of one or more) at the mating time with the teeth of the mating gear. As a result, the mating with the teeth of the mating gear starts with the point contact or the line contact shorter than the total tooth width. Then, the point contact gradually moves to the line contact shorter than the total tooth width, and thereafter, further gradually moves to the larger line contact within the range of the total tooth width. Further, the line contact shorter than the total tooth width then gradually moves to the larger line contact within the range of the total tooth width. A shifting region of the point contact or the line contact shorter than the total tooth width is on the tooth tip side from the vicinity of the branching point between the (n+1) teeth mating and the n teeth mating at the mating time with the teeth of the mating gear. Accordingly, in the mating with the opposite teeth of the mating gear, the rotational motion can be surely transmitted by a portion serving as a main power transmission plane, in a state where the tooth flank is formed from the one end portion to the other end portion in the tooth width direction.

In accordance with a second aspect of the present invention, a gearing apparatus is provided for transmitting a rotational motion from one to the other of associated two shafts by engaging a pair of engaged gears to allow opposite teeth of the engaged gears to be mated with each other, wherein for at least one gear of the pair of gears, a predetermined region in at least one of tooth flanks of each tooth is formed in a configuration such that mating of each tooth of the one gear with the teeth of the other engaged gear starts with a point contact or a line contact shorter than a total length of a tooth width from at least one place in a tooth width direction on a crossing of the tooth flank and a tooth tip surface and thereafter, gradually shifts to the line contact so that a length of contact line thereof is continuously increased as the line contact moves from a tooth tip side toward a tooth root side.

According to the above configuration, for at least one gear in the pair of gears, the predetermined region in at least one tooth flank of each tooth is formed in the shape such that, from at least one place in the tooth width direction on the crossing of the tooth flank and the tooth tip surface, the mating with the teeth of the mating gear starts with the point contact or the line contact shorter than the total tooth width, and thereafter, gradually shifts to the line contact so that the length of contact line thereof is continuously increased as the line contact moves from the tooth tip side toward the tooth root side. In this case, mainly in the gear on a driven side, the contact at the mating time of the opposite teeth does not start firstly with the line contact of the total tooth width, but starts with the point contact or the line contact shorter than the total tooth width. Then, the point contact gradually moves to the line contact shorter than the total tooth width, and thereafter, further gradually moves to the larger line contact within a range of the total tooth width. Further, the line contact shorter than the total tooth width then gradually moves to the larger line contact within the range of the total tooth width. As a result, the contact to the teeth of the mating gear is softened and therefore, the shock can be absorbed. Accordingly, it is possible to reduce the generation of vibration during engagement of the pair of gears due to mating of the teeth with each other, to thereby reduce the noise due to the mating. Further, by reducing the vibration, it is possible to reduce the error in gear rotation transmission.

In accordance with a third aspect of the present invention, there are provided gears comprised of one and the other mutually engaged gears, each having a plurality of teeth to be mated with teeth of the other engaged gear to thereby transmit a rotational motion, wherein a predetermined region in at least one of tooth flanks of each tooth is formed in a configuration such that mating of each tooth of the one gear with the teeth of the other engaged gear starts with a point contact or a line contact shorter than the total tooth width from at least one place in a tooth width direction on a crossing of the tooth flank and a surface of tooth root and thereafter, gradually shifts to the line contact so that the length of contact line thereof is continuously increased as the line contact moves from a tooth root side toward a tooth tip side. It should be understood that the term "surface" generally includes not only a flat surface but also a surface with a curvature of unevenness throughout the description of this specification.

According to the above configuration, the predetermined region in at least one tooth flank of each tooth is formed in the shape such that, from at least one place in the tooth width direction on the crossing of the tooth flank and the tooth tip surface, mating of each tooth of the one gear with the teeth of the other engaged gear starts with the point contact or the line contact shorter than the total tooth width and thereafter, gradually shifts to the line contact so that the length of contact line thereof is continuously increased as the line contact moves from the tooth root side toward the tooth tip side. In this case, mainly in the gear on a driving side, the contact by mating with the opposite teeth does not start firstly with the line contact on the tooth flank, but starts with the point contact or the line contact shorter than the total tooth width. Then, the point contact gradually moves to the line contact shorter than the total tooth width, and thereafter, further gradually moves to the larger line contact within a range of the total tooth width. Further, the line contact shorter than the total tooth width then gradually moves to the larger line contact within the range of the total tooth width. As a result, the contact to the teeth of the mating gear is softened and therefore, the shock can be absorbed.

In accordance with a fourth aspect of the present invention, a gearing apparatus is provided for transmitting a rotational motion from one to the other of associated two shafts by engaging a pair of gears to allow opposite teeth of the engaged gears to be mated with each other, wherein for at least one gear of the pair of gears, a predetermined region in at least one of tooth flanks of each tooth is formed in a configuration such that mating of each tooth of one of the engaged pair of gears with the teeth of the other engaged gear starts with a point contact or a line contact shorter than the total tooth width from at least one place in a tooth width direction on a crossing of the tooth flank and a surface of tooth root and thereafter, gradually moves to the line contact so that a length of contact line thereof is continuously increased as the line contact moves from a tooth root side toward a tooth tip side.

According to the above configuration, for at least one gear in the pair of gears, the predetermined region in at least one tooth flank of each tooth is formed in the shape such that, from at least one place in the tooth width direction on the crossing of the tooth flank and the tooth root surface, the mating with the teeth of the mating gear starts with the point contact or the line contact shorter than the total tooth width, and thereafter, gradually moves to the line contact so that the length of contact line thereof is sequentially increased as the line contact moves from the tooth root side toward the tooth tip side. In this case, mainly in the gear on a driving side, the contact at the mating time of the opposite teeth does not start firstly with the line contact of the total tooth width on the tooth flank, but starts with the point contact or the line contact shorter than the total tooth width. Then, the point contact gradually moves to the line contact shorter than the total tooth width, and thereafter, further gradually moves to the larger line contact within a range of the total tooth width. Further, the line contact shorter than the total tooth width then gradually moves to the larger line contact within the range of the total tooth width. As a result, the contact to the teeth of the mating gear is softened and therefore, the shock can be absorbed.

In accordance with a fifth aspect of the present invention, there are provided gears comprised of one and the other mutually engaged gears, each provided with a plurality of teeth to be mated with the teeth of the other engaged gear to thereby transmit a rotational motion, wherein a predetermined region in at least one of tooth flanks of each tooth of the one gear is formed in a configuration such that mating of each tooth of the one gear with the teeth of the other engaged gear starts with a point contact or a line contact shorter than the total tooth width from at least one place in a tooth width direction on a crossing of the tooth flank and a surface of tooth tip and thereafter, rapidly or in stepwise shifts to the line contact of a total length of the tooth width from a tooth tip side toward a tooth root side so that the length of contact line thereof is increased.

According to the above configuration, the predetermined region in at least one tooth flank of each tooth is formed in the shape such that, from at least one place in the tooth width direction on the crossing of the tooth flank and the tooth tip surface, the mating with the teeth of the mating gear starts with the point contact or the line contact shorter than the total tooth width, and thereafter, rapidly or in stepwise shifts to the line contact of the total tooth width from the tooth tip side toward the tooth root side so that the length of contact line thereof is increased. In this case, mainly in the gear on a driven side, the contact at the mating time of the opposite teeth does not start firstly with the line contact on the tooth flank, but starts with the point contact or the line contact shorter than the total tooth width. Then, the point contact rapidly or in stepwise moves to the line contact shorter than the total tooth width, and thereafter, further rapidly or in stepwise moves to the larger line contact within a range of the total tooth width. Further, the line contact shorter than the total tooth width then rapidly or in stepwise moves to the larger line contact within the range of the total tooth width. As a result, the contact to the teeth of the mating gear is softened and therefore, the shock can be absorbed.

In accordance with a sixth aspect of the present invention, a gearing apparatus is provided for transmitting a rotational motion from one to the other of associated two shafts by engaging a pair of gears to allow opposite teeth of the mating gears to be mated with each other, wherein for at least one gear of the pair of gears, a predetermined region in at least one of tooth flanks of each tooth is formed in a configuration such that mating of each tooth of the one gear with the teeth of the other engaged gear starts with a point contact or a line contact shorter than the total tooth width from at least one place in a tooth width direction on a crossing of the tooth flank and a tooth tip surface and thereafter, rapidly or in stepwise shifts to the line contact of the total tooth width from a tooth tip side toward a tooth root side so that the length of contact line thereof is increased.

According to the above configuration, for at least one gear of the pair of gears, the predetermined region in at least one tooth flank of each tooth is formed in the shape such that, from at least one place in the tooth width direction on the crossing of the tooth flank and the tooth tip surface, the mating of each tooth of one gear with the teeth of the other engaged gear starts with the point contact or the line contact shorter than the total tooth width and thereafter, rapidly or in stepwise shifts to the line contact of the total length of a tooth width from the tooth tip side toward the tooth root side so that the length of contact line thereof is increased. In this case, mainly in the gear on a driven side, the contact at the mating time of the opposite teeth does not start firstly with the line contact of the total tooth width on the tooth flank, but starts with the point contact or the line contact shorter than the total tooth width. Then, the point contact rapidly or in stepwise moves to the line contact shorter than the total tooth width, and thereafter, further rapidly or in stepwise moves to the larger line contact within a range of the total tooth width. Further, the line contact shorter than the total tooth width then rapidly or in stepwise moves to the larger line contact within the range of the total tooth width. As a result, the contact to the teeth of the mating gear is softened and therefore, the shock can be absorbed.

In accordance with a seventh aspect of the present invention, there are provided gears comprised of one and the other mutually engaged gears, each provided with a plurality of teeth to be mated with the teeth of the engaged gear to thereby transmit a rotational motion, wherein a predetermined region in at least one of tooth flanks of each tooth is formed in a configuration such that mating of each tooth of the one gear with the teeth of the other engaged gear starts with a point contact or a line contact shorter than the total tooth width from at least one place in a tooth width direction on a crossing of the tooth flank and a surface of tooth root, and thereafter, rapidly or in stepwise moves to the line contact of the total tooth width from a tooth root side toward a tooth tip side so that the length of contact line thereof is increased.

According to the above configuration, the predetermined region in at least one tooth flank of each tooth is formed in the shape such that, from at least one place in the tooth width direction on the crossing of the tooth flank and the tooth root surface, the mating with the teeth of the mating gear starts with the point contact or the line contact shorter than the total tooth width, and thereafter, rapidly or in stepwise moves to the line contact of the total tooth width from the tooth root side toward the tooth tip side so that the length of contact line thereof is increased. In this case, mainly in the gear on a driving side, the contact at the mating time of the opposite teeth does not start firstly with the line contact on the tooth flank, but starts with the point contact or the line contact shorter than the total tooth width. Then, the point contact rapidly or in stepwise moves to the line contact shorter than the total tooth width, and thereafter, further rapidly or in stepwise moves to the larger line contact within a range of the total tooth width. Further, the line contact shorter than the total tooth width then rapidly or in stepwise moves to the larger line contact within the range of the total tooth width. As a result, the contact to the teeth of the mating gear is softened and therefore, the shock can be absorbed.

In accordance with an eighth aspect of the present invention, a gearing apparatus is provided for transmitting a rotational motion from one to the other of two associated shafts by engagement of a pair of gears to allow opposite teeth of the mating gears to be mated with each other, wherein for at least one gear of the pair of gears, a predetermined region in at least one of tooth flanks of each tooth is formed in a configuration such that mating of each tooth of the one gear with the teeth of the other engaged gear starts with a point contact or a line contact shorter than the total tooth width from at least one place in a tooth width direction on a crossing of the tooth flank and a tooth root surface and thereafter, rapidly or in stepwise shifts to the line contact of the total tooth width from a tooth root side toward a tooth tip side so that the length of contact line thereof is increased.

According to the above configuration, for at least one gear of the pair of gears, the predetermined region in at least one tooth flank of each tooth is formed in the shape such that, from at least one place in the tooth width direction on the crossing of the tooth flank and the tooth root surface, the mating with the teeth of the mating gear starts with the point contact or the line contact shorter than the total tooth width, and thereafter, rapidly or in stepwise moves to the line contact of the total tooth width from the tooth root side toward the tooth tip side so that the length of contact line thereof is increased. In this case, mainly in the gear on a driving side, the contact at the mating time of the opposite teeth does not start firstly with the line contact of the total tooth width on the tooth flank, but starts with the point contact or the line contact shorter than the total tooth width. Then, the point contact rapidly or in stepwise moves to the line contact shorter than the total tooth width, and thereafter, further rapidly or in stepwise moves to the larger line contact within a range of the total tooth width. Further, the line contact shorter than the total tooth width then rapidly or in stepwise moves to the larger line contact within the range of the total tooth width. As a result, the contact to the teeth of the mating gear is softened and therefore, the shock can be absorbed.

The other objects and features of the invention will become understood from the following description with reference to the accompanying drawings.

BRIEF DESCRIPTION OF THE DRAWINGS

FIGS. 24A through 24C are cross section explanatory diagrams showing combination states of the one gear and the other gear in the gearing apparatus configured as above.

DETAILED DESCRIPTION OF THE INVENTION

There will be described hereunder embodiments of the present invention based on the accompanying drawings.

Figure 1:
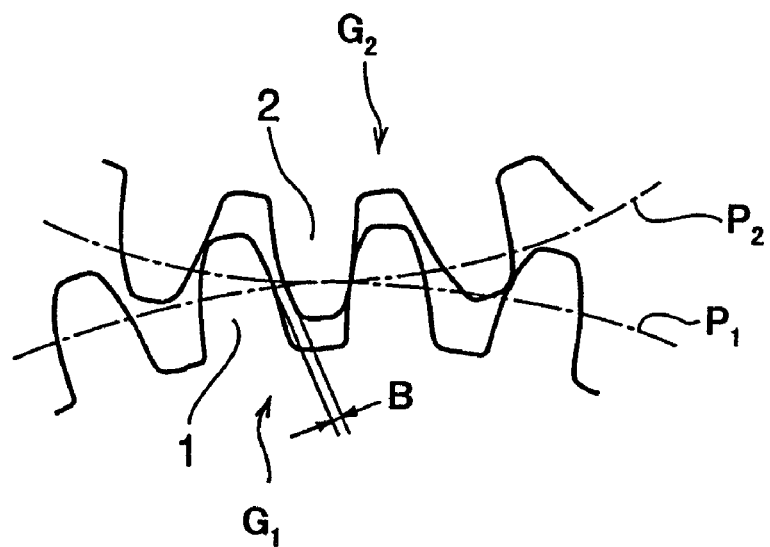
FIG. 1 is a diagram showing an embodiment of a gearing apparatus according to the present invention, for explaining a main part of the apparatus in a state where a pair of gears is engaged with each other.

FIG. 1 is a diagram showing an embodiment of a gearing apparatus according to the present invention, for explaining a main part of the apparatus in a state where a pair of gears is mated with each other. This gearing apparatus is for transmitting a rotational motion from one shaft to the other of two associated shafts by engagement of the pair of gears so as to mate opposite teeth of the engaged gears with each other, and is configured by combining one gear $G_1$ and the other gear $G_2$. The one gear $G_1$ is, for example a gear having a small number of teeth, and is called a pinion. The other gear $G_2$ is, for example a gear having a large number of teeth, and is called a main wheel.

In FIG. 1, symbol $P_1$ indicates a pitch circle of the one gear $G_1$, and symbol $P_2$ indicates a pitch circle of the other gear $G_2$. Further, symbol B indicates a backlash which is a clearance between a tooth flank of a tooth 1 and a tooth flank of a tooth 2 for when the pair of gears $G_1$ and $G_2$ are mated with each other.

Figure 2:
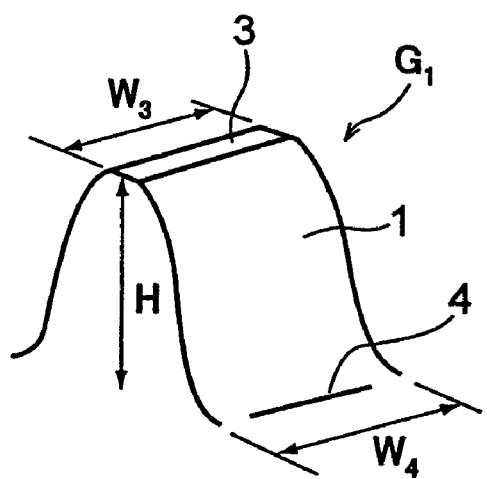
FIG. 2 is a perspective view showing a tooth profile of a standard gear.

Firstly, there will be described a shape of the one gear $G_1$. This gear $G_1$ is provided with a plurality of teeth 1, 1, . . . , and these teeth 1 are mated with teeth 2 of the mating gear ($G_2$), to thereby transmit the rotational motion. Typically, as shown in FIG. 2, each of the teeth 1 is formed in a standard gear tooth profile which is made symmetric by an involute curve. Namely, in each of the teeth 1, the tooth width $W_3$ of a tooth tip surface 3 has the same size as the tooth width $W_4$ of a tooth root 4, and the total tooth height H is fixed in a tooth width direction.

Figure 3:
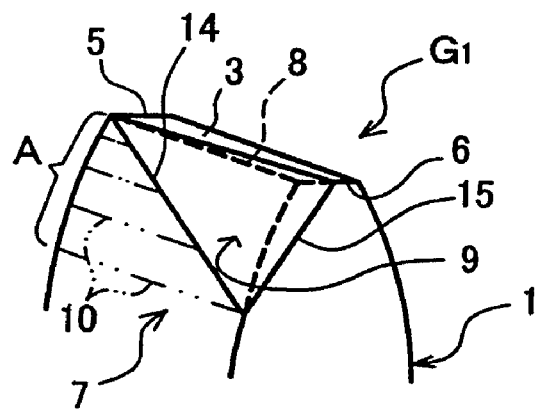
FIG. 3 is a perspective view showing a profile of a tooth of one of the pair of gears.

Here, in the present invention, as shown in FIG. 3, in each of the teeth 1, a predetermined region A in at least one tooth flank 7 of each tooth 1 is formed in a configuration such that, from at least one place in the tooth width direction on a crossing 8 of the tooth flank 7 and the tooth tip surface 3, the mating with the teeth of the mating gear starts with the point contact or the line contact shorter than the total tooth width, and thereafter, gradually shifts or moves to the line contact so that the length of contact line thereof is sequentially increased as the line contact moves from a tooth tip side (3) toward a tooth root side (4). In the example of FIG. 3, the predetermined region A in the tooth flank is chamfered, so that the configuration thereof is made to be an inclined plane which extends from the one place in the tooth width direction on the crossing 8 of the tooth flank 7 and the tooth tip surface 3 toward one of end faces of the tooth 1. Namely, a chamfered portion 9 is formed, by cutting away from the one tooth flank 7 a triangular inclined plane which extends from a corner portion on a side of one end portion 5 in the tooth width direction of the tooth tip surface 3 toward an involute curve portion on a side of the other end portion 6.

Figure 4:
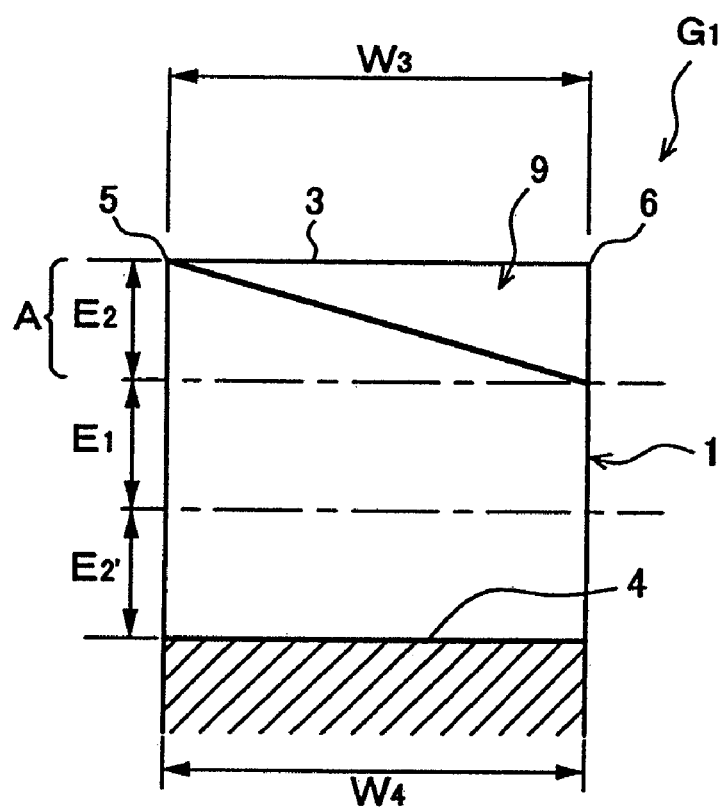
FIG. 4 is a side view explaining the detail of the tooth profile formed as shown in FIG. 3.

FIG. 4 is a side view explaining the details of the shape of the tooth 1 formed as shown in FIG. 3. Here, the predetermined region A in the tooth flank is a region on the tooth tip side from the vicinity of a branching point between the (n+1) teeth mating and the n teeth mating (n is integer of one or more) at the mating time with the teeth (2) of the mating gear ($G_2$). The example of FIG. 4 shows the case where a mating rate to the teeth (2) of the mating gear ($G_2$) is equal to or larger than 1, but equal to or smaller than 2, and the predetermined region A in the tooth flank is the region on the tooth tip side from the vicinity of the branching point between the 2 teeth mating and the 1 tooth mating. Namely, in FIG. 4, provided that a 1 tooth mating region is $E_1$ in an intermediate portion and 2 teeth mating regions are $E_2$ on the tooth tip side and $E_2'$ on the tooth root side, the predetermined region A in the tooth flank is the 2 teeth mating region $E_2$ on the tooth tip side.

According such a shape, the configuration of the predetermined region A in at least the one tooth flank 7 of each tooth 1 can be formed such that the mating with the teeth (2) of the mating gear ($G_2$) starts from the corner portion on the one end portion 5 side in the tooth width direction of the tooth tip surface 3 with the point contact or the line contact shorter than the total tooth width, and thereafter, gradually shifts to the line contact so that the length of contact line 10 thereof is sequentially increased as the line contact moves from the tooth tip side (3) toward the tooth root side (4). In this case, mainly in the gear on a driven side, the contact at the mating time of the opposite teeth 1 and 2 does not start firstly with the line contact of the total tooth width, but starts with the point contact or the line contact shorter than the total tooth width. Then, the point contact gradually shifts to the line contact shorter than the total tooth width, and thereafter, further gradually shifts to the larger line contact within a range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed. Accordingly, it is possible to reduce the vibration generation at the time when the pair of gears is engaged with each other, to thereby reduce noise due to the mating of the teeth. Further, by reducing the vibration, it is possible to reduce an error in gear rotation transmission.

Further, in the mating of the teeth 1 and 2 of the gears, although a tooth sliding speed is higher in the tooth flank, since the chamfered portion 9 is formed in the tooth flank of each tooth 1 as described above, the contact line 10 in the portion where the tooth sliding speed is higher is reduced so that a contact area is small, and therefore, sliding noise due to the tooth sliding can also be reduced.

Incidentally, in the mating of opposite teeth 1 and 2 in FIG. 1, since portions serving as main power transmission planes are the 1 tooth mating region $E_1$ and the 2 teeth mating region $E_2'$ on the tooth root side, shown in FIG. 4, the tooth flank is formed from one edge up to the other edge in a tooth width $W_3$ direction, and therefore, the rotational motion can be surely and sufficiently transmitted.

Moreover, in FIG. 3, a boundary line 14 on a side of the tooth flank 7 and a boundary line 15 on an end face on the other end portion 6 side, of the chamfered portion 9 which is cut away from the one tooth flank 7 in the triangular inclined plane, are formed in a linear shape. However, these boundary lines are not limited to this shape, and may be formed in a curved shape. Further, the chamfered portion 9 is not limited to the inclined plane, and may be formed in a convex curved surface or a concave curved surface, or may be formed in a lightening shape of fixed depth. Furthermore, differently from the example of FIG. 4, in the case where the mating rate to the teeth (2) of the mating gear ($G_2$) is equal to or larger than 2 but is equal to or smaller than 3, a region on the tooth tip side from the vicinity of the branching point between the 3 teeth mating and the 2 teeth mating of the tooth tip side may be made the predetermined region A.

Figure 5:
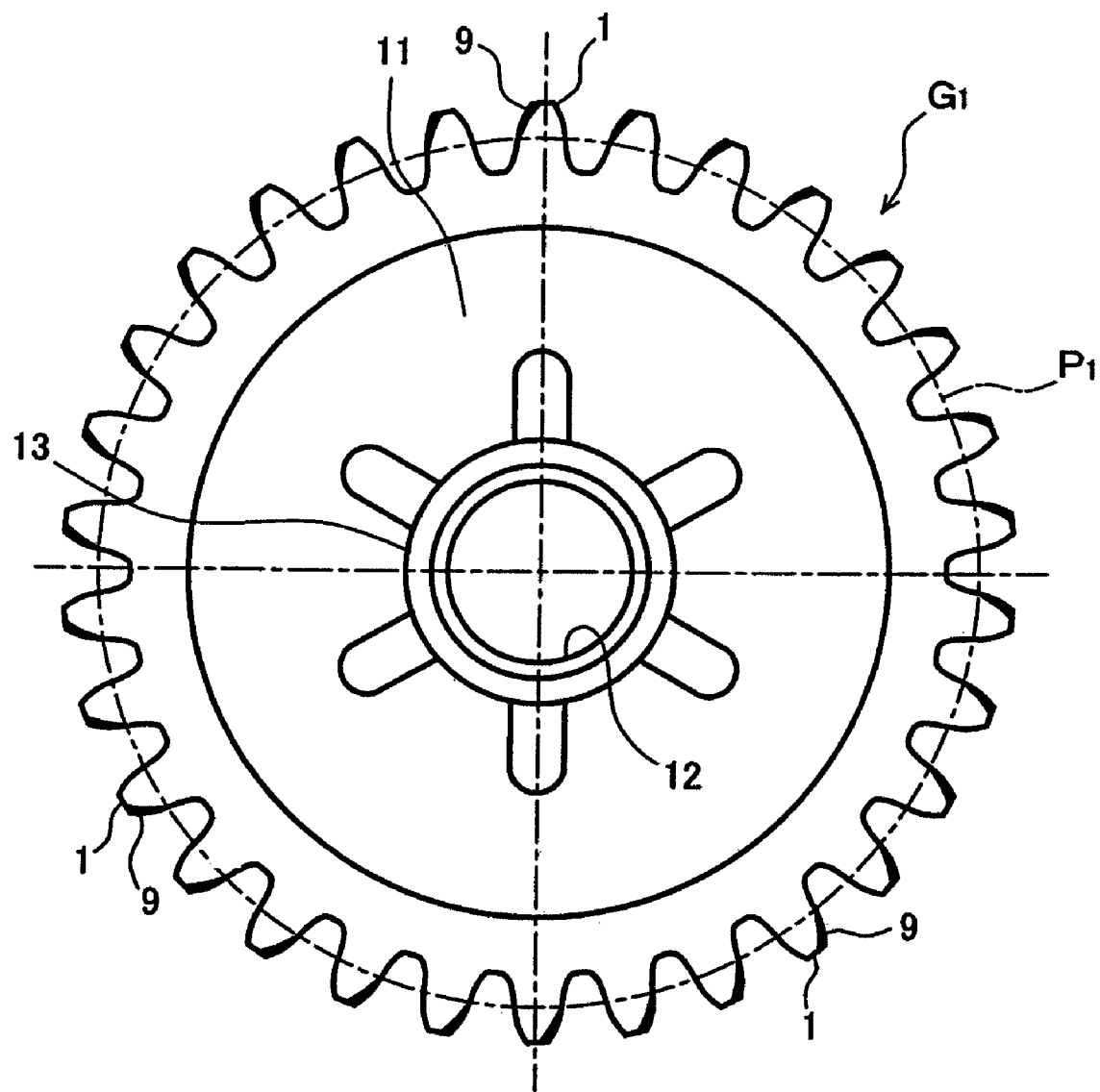
FIG. 5 is a front elevation view showing an entire shape of the one gear.

FIG. 5 is a front elevation view showing the entire shape of the one gear $G_1$ configured as described in the above. In FIG. 5, the gear $G_1$ is configured such that the plurality of teeth 1, 1, . . . are formed on an outer periphery side of a web 11 of substantially circular plate, and a boss 13 through which a shaft bore 12 fixing therein a rotation shaft is formed, is formed on a center portion of the web 11, so that the rotational motion is transmitted between parallel two shafts. Note, the symbol $P_1$ indicates the pitch circle of the one gear $G_1$.

Figure 6:
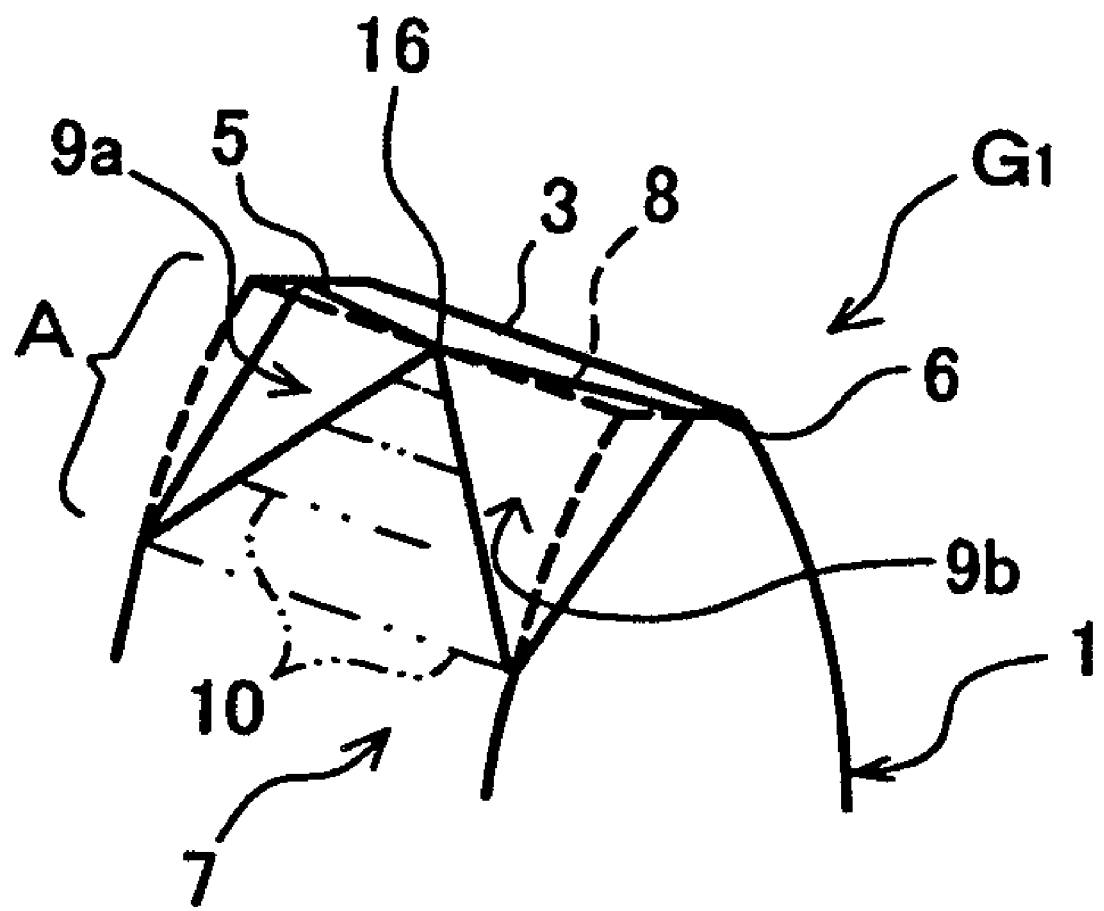
FIG. 6 is a main part perspective view showing a second embodiment of the profile of the tooth of the one gear.

FIG. 6 is a main part perspective view showing a second embodiment of the shape of the tooth 1 of the gear $G_1$. In this embodiment, the predetermined region A in the tooth flank is chamfered so that the configuration thereof is made to be inclined planes which extend from the one place in the tooth width direction on the crossing 8 of the one tooth flank 7 and the tooth tip surface 3 to both of the end faces of the tooth 1. Namely, chamfered portions 9a and 9b are formed, by cutting away from the one tooth flank 7 predetermined places in the tooth width direction on the crossing 8 of the one tooth flank 7 and the tooth tip surface 3 in triangular inclined planes, in this case, from a center portion 16 toward the involute curve portions on the end portion 5 and 6 sides on both sides.

According to such a shape, the configuration of the predetermined region A in at least the one tooth flank 7 of each tooth 1 can be formed such that the mating with the teeth (2) of the mating gear ($G_2$) starts from the center portion 16 in the tooth width direction of the tooth tip surface 3 with the point contact or the line contact shorter than the total tooth width, and thereafter, gradually shifts to the line contact so that the length of contact line 10 thereof is sequentially increased as the line contact moves from the tooth tip side (3) toward the tooth root side (4). In this case, the contact at the mating time of the opposite teeth 1 and 2 does not start firstly with the line contact of the total tooth width at a tooth tip portion, but starts with the point contact or the line contact shorter than the total tooth width. Then, the point contact gradually shifts to the line contact shorter than the total tooth width, and thereafter, further gradually shifts to the larger line contact within the range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed.

Incidentally, in FIG. 6, boundary lines on the tooth flank 7 side and boundary lines on the end faces on the end portion 5 and 6 sides on both sides, of the chamfered portions 9a and 9b which are cut away from the one tooth flank 7 in the triangular inclined planes, are formed in a linear shape. However, these boundary lines are not limited to this shape, and may be formed in a curved shape. Further, the chamfered portions 9a and 9b are not limited to the inclined planes, and may be formed in a convex curved surface or a concave curved surface, or may be formed in a lightening shape of fixed depth.

Figure 7A:
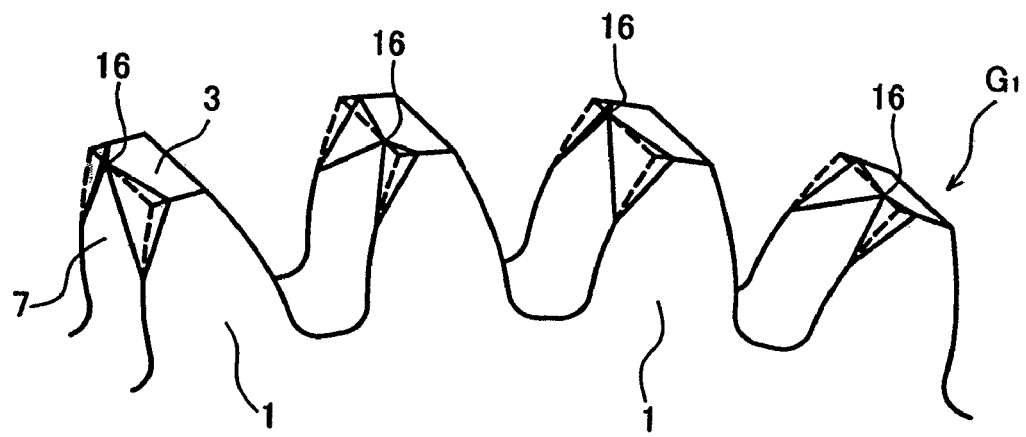
FIGS. 7A and 7B are main part perspective views showing modified examples of the profile of the tooth of the one gear in the second embodiment.
Figure 7B:
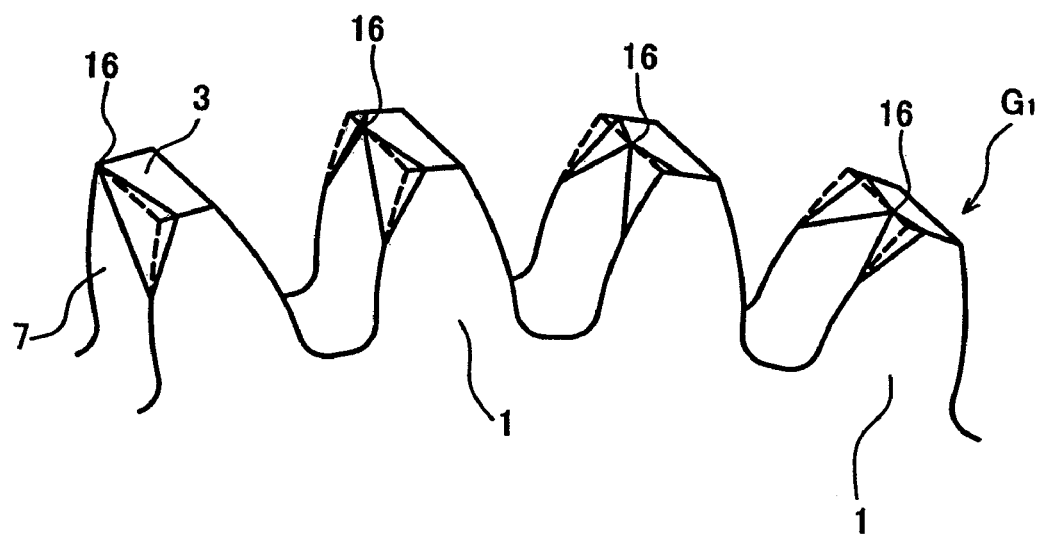
Figure 8A:
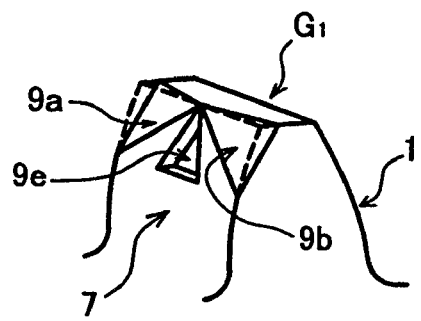
FIGS. 8A through 8D are main part perspective views showing further modified examples of the profile of the tooth of the one gear in the second embodiment.
Figure 8B:
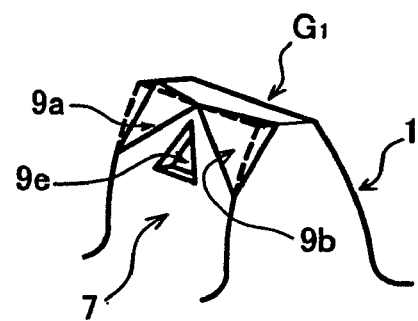
Figure 8C:
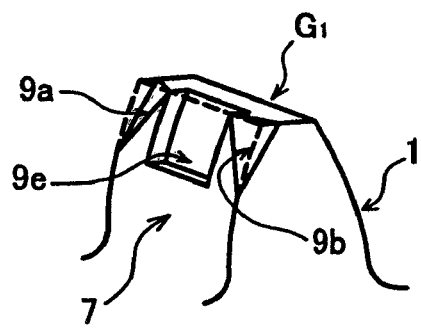
Figure 8D:
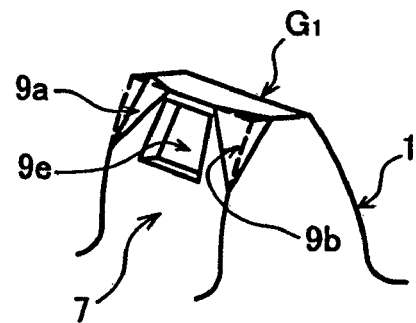

FIGS. 7A and 7B are main part perspective views showing modified examples of the shape of the tooth 1 of the gear $G_1$ in the second embodiment. In these modified examples, a position (16) of the one place in the tooth width direction in the embodiment shown in FIG. 6 for when the chamfering is performed so as to form, on the crossing 8 of the one tooth flank 7 and the tooth tip surface 3, the inclined planes which extend from the one place in the tooth width direction toward both of the end faces of the tooth 1, is not limited to the center portion in the tooth width direction, and is set at an arbitrary position in the tooth width direction within the tooth width for each tooth 1. FIG. 7A shows a state where the position (16) of the one place is set so as to be shifted irregularly within the tooth width. FIG. 7B shows a state where the position (16) of the one place is set to be shifted sequentially from the one side end portion to the other end portion within the tooth width.

FIGS. 8A through 8D are main part perspective views showing further modified examples of the shape of the tooth 1 of the gear $G_1$ in the second embodiment. In each of these modified examples, a recess 9e of triangle, square, trapezoid or the like of certain fixed depth is formed between the chamfered portions 9a and 9b which are formed, by cutting away the triangular inclined planes from the one tooth flank 7 in the embodiment shown in FIG. 6. In this case, it is possible to further reduce the length of the line contact on the tooth tip side in each tooth 1.

Figure 9:
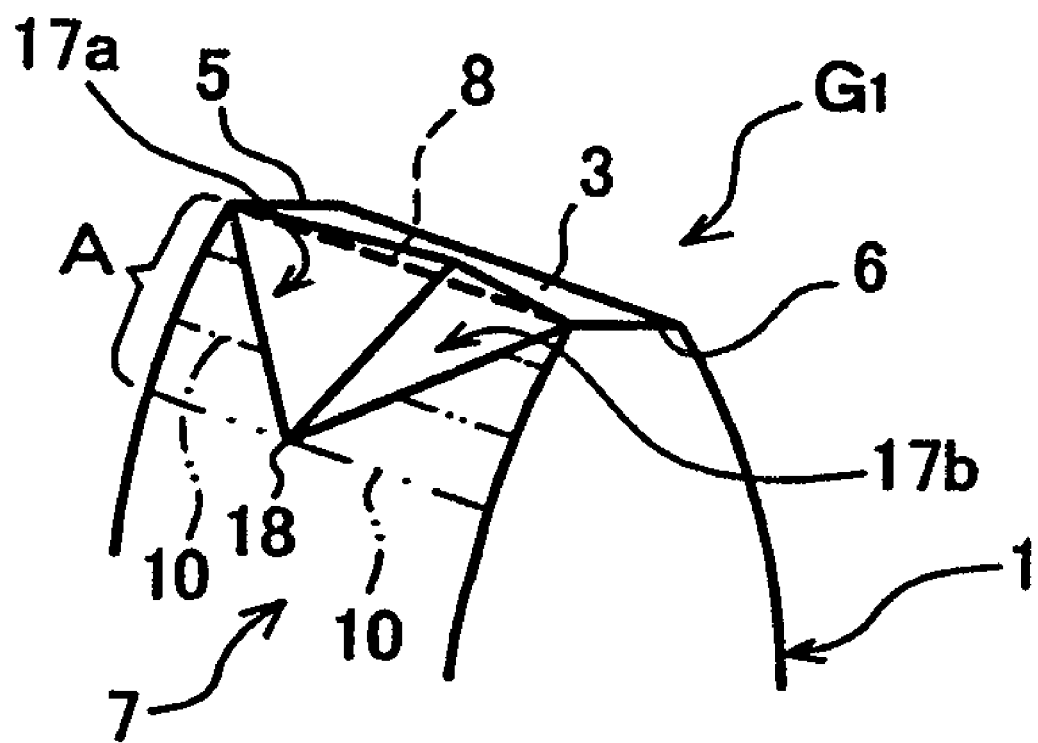
FIG. 9 is a main part perspective view showing a third embodiment of the profile of the tooth of the one gear.

FIG. 9 is a main part perspective view showing a third embodiment of the shape of the tooth 1 of the gear $G_1$. In this embodiment, chipped portions 17a and 17b are formed so that the configuration of the predetermined region A in the tooth flank is made to be inclined planes which extend from the one place on the one tooth flank 7 to both of the end face sides toward the crossing 8 of the tooth flank 7 and the tooth tip surface 3. Namely, the chipped portions 17a and 17b are formed, by chipping off from the tooth flank 7 the triangular inclined planes which extend from a site 18 of the one place on the one tooth flank 7 to both of the end face sides toward the crossing 8 of the tooth flank 7 and the tooth tip surface 3.

According to such a shape, the configuration of the predetermined region A in at least the one tooth flank 7 of each tooth 1 can be formed such that the mating with the teeth (2) of the mating gear ($G_2$) is started from the corner portion on the one end portion 5 side or the other end portion 6 side in the tooth width direction of the tooth tip surface 3 with the point contact or the line contact shorter than the total tooth width, and thereafter, is gradually shifted to the line contact so that the length of contact line 10 thereof is sequentially increased as the line contact moves from the tooth tip side (3) toward the tooth root side (4). In this case, the contact at the mating time of the opposite teeth 1 and 2 does not start firstly with the line contact of the total tooth width at the tooth tip portion, but starts with the point contact or the line contact shorter than the total tooth width. Then, the point contact gradually shifts to the line contact shorter than the total tooth width, and thereafter, further gradually shifts to the larger line contact within the range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed.

Incidentally, in FIG. 9, boundary lines on the tooth flank 7 side of the chipped portions 17a and 17b which are chipped off from the one tooth flank 7 in the triangular inclined planes, are formed in a linear shape. However, these boundary lines are not limited to this shape, and may be formed in a curved shape.

Figure 10A:
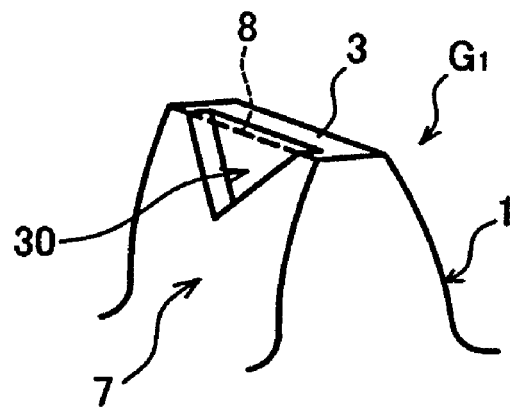
FIGS. 10A and 10B are main part perspective views showing modified examples of the profile of the tooth of the one gear in the third embodiment.
Figure 10B:
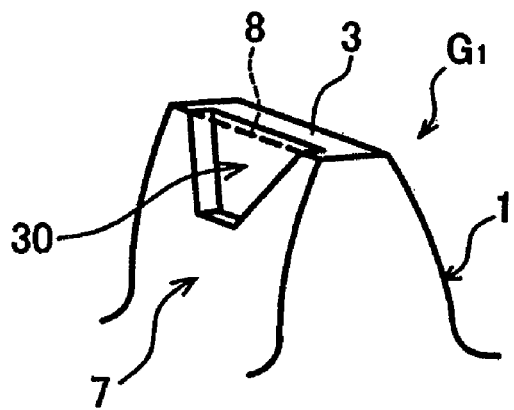

FIGS. 10A and 10B are main part perspective views showing modified examples of the shape of the tooth 1 of the gear $G_1$ in the third embodiment. In each of these modified examples, in place of the chipped portions 17a and 17b of triangular inclined planes which are formed on the one tooth flank 7 in the embodiment shown in FIG. 9, a lightening portion 30 of triangle, trapezoid or the like of certain fixed depth is formed on the one tooth flank 7 toward the crossing 8 of the tooth flank 7 and the tooth tip surface 3.

Figure 11A:
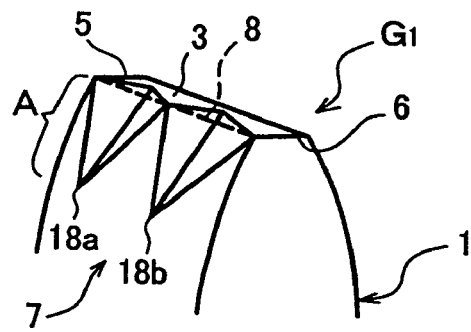
FIGS. 11A through 11D are main part perspective views showing further modified examples of the profile of the tooth of the one gear in the third embodiment.
Figure 11B:
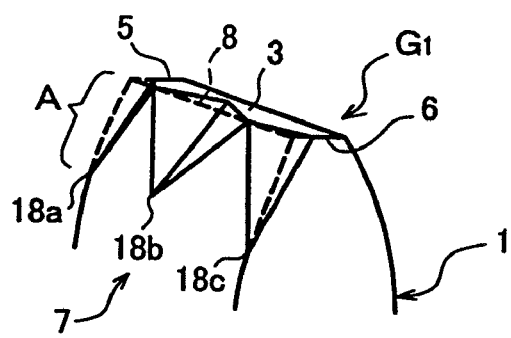
Figure 11C:
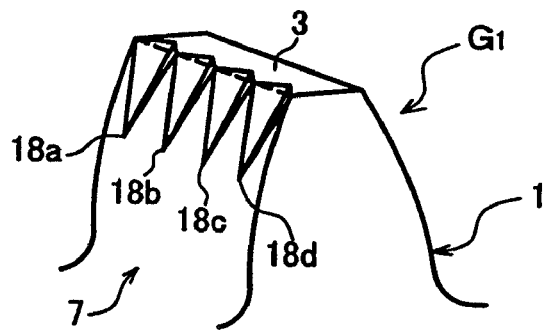
Figure 11D:
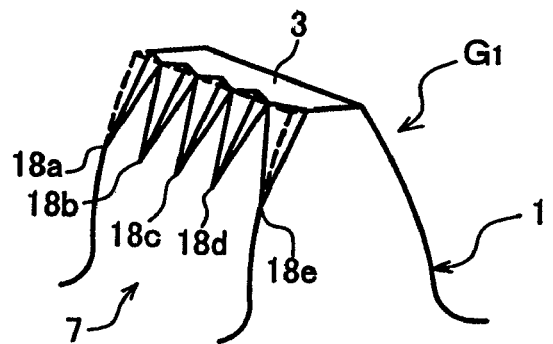

FIGS. 11A through 11D are main part perspective views showing further modified examples of the shape of the tooth 1 of the gear $G_1$ in the third embodiment. In each of these modified examples, the chipped portions 17a and 17b shown in FIG. 9 are formed on plural places in the one tooth flank 7. In FIG. 11A, the chipped portions 17a and 17b are formed in plural places by chipping off from the one tooth flank 7 triangular inclined planes which extend from two sites 18a and 18b on the one tooth flank 7 toward the crossing 8 of the tooth flank 7 and the tooth tip surface 3 to both of the end face sides. Further, in FIG. 11B, the chipped portions 17a and 17b are formed in plural places by chipping off from the one tooth flank 7 triangular incline planes which extend from three sites 18a, 18b and 18c on the one tooth flank 7 toward the crossing 8 of the tooth flank 7 and the tooth tip 3 to both of the end face sides. Similarly to this, the chipped portions 17a and 17b are formed in plural places by chipping off from the one tooth flank 7 triangular inclined planes which extend from four sites 18a, 18b, 18c and 18d in FIG. 11C, and five sites 18a, 18b, 18c, 18d and 18e in FIG. 11D, on the one tooth flank 7 toward the crossing 8 of the tooth flank 7 and the tooth tip surface 3 to both of the end face sides.

Figure 12A:
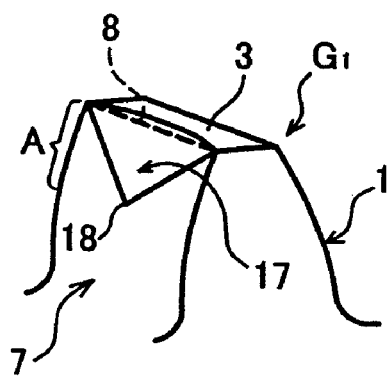
FIGS. 12A through 12C are main part perspective views showing still further modified examples of the profile of the tooth of the one gear in the third embodiment.
Figure 12B:
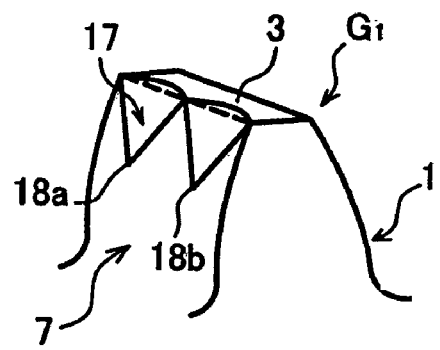
Figure 12C:
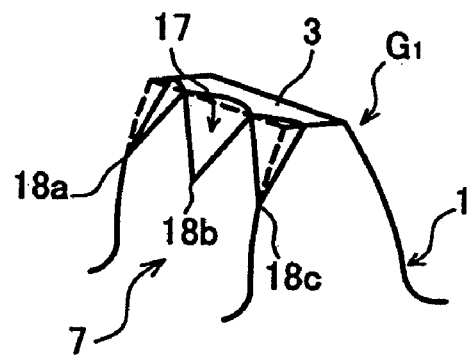

FIGS. 12A though 12C are main part perspective views showing still further modified examples of the shape of the tooth 1 of the gear $G_1$ in the third embodiment. In each of these modified examples, as shown in FIG. 12A, for the predetermined region A in the tooth flank in the embodiment shown in FIG. 9, the chipped portion 17 is formed, by chipping off from the tooth flank 7 a fan-shaped concave curved surface which extends from the site 18 of the one place on the one tooth flank 7 toward the crossing 8 of the tooth flank 7 and the tooth tip surface 3 to both of the end face sides. Further, in FIG. 12B, the chipped portion 17 is formed in plural places by chipping off or cutting away from the tooth flank 7 fan-shaped concave curved surfaces which extend from the two sites 18a and 18b on the one tooth flank 7 toward the crossing 8 of the tooth flank 7 and the tooth tip surface 3 to both of the end face sides. Furthermore, in FIG. 12C, the chipped portion 17 is formed in plural places by chipping off from the tooth flank 7 fan-shaped concave curved surfaces which extend from the three sites 18a, 18b and 18c on the one tooth flank 7 toward the crossing 8 of the tooth flank 7 and the tooth tip surface 3 to both of the end face sides.

Figure 13:
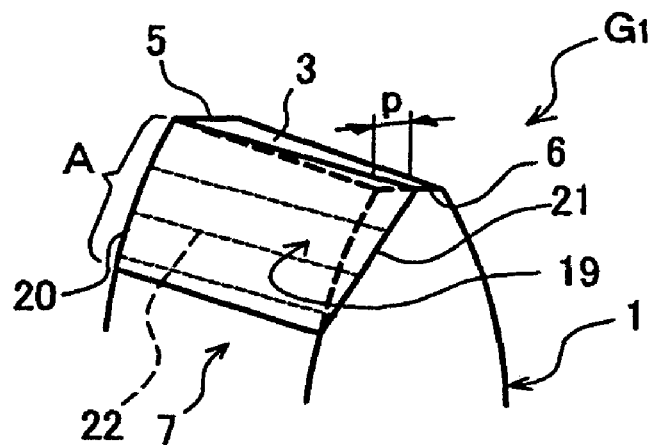
FIG. 13 is a main part perspective view showing a fourth embodiment of the profile of the tooth of the one gear.
Figure 14:
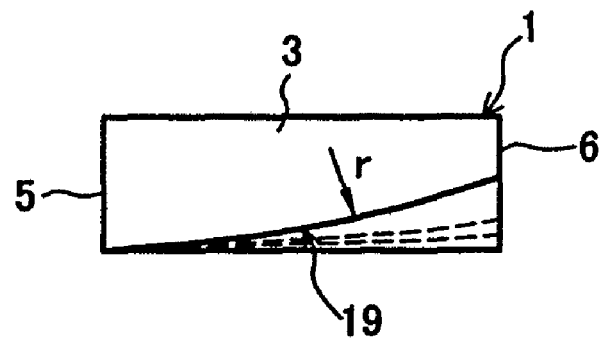
FIG. 14 is an explanatory diagram showing a planar vision shape of a curved surface in one of tooth flanks of the tooth shown in FIG. 13 viewed from above a tooth tip surface thereof.

FIG. 13 is a main part perspective view showing a fourth embodiment of the shape of the tooth 1 of the gear $G_1$. In this embodiment, for the predetermined region A in the tooth flank, a curved surface 19 which gradually decreases the tooth thickness is formed from the one end face of the tooth toward the other end face thereof in the tooth width direction of the one tooth flank 7. Namely, the curved surface 19 is formed in a convex curved surface, and smoothly connects with parallel curves 22 between an involute curve 20 on the one end portion 5 side in the tooth width direction of the one tooth flank 7 and a curve 21 which modifies the tooth thickness of the tooth tip surface 3 on the other end portion 6 side with a modification amount p. At this time, a planar vision shape of the curved surface 19 viewed from above the tooth tip surface 3 of the tooth 1 in FIG. 13 is shown in FIG. 14, in which a curvature radius r of the curved surface 19 in the tooth width direction is sequentially increased from the tooth tip to the tooth root 4 side.

According to such a shape, the configuration of the predetermined region A in at least the one tooth flank 7 of each tooth 1 can be formed such that the mating with the teeth (2) of the mating gear ($G_2$) starts from the one end portion 5 side in the tooth width direction of the tooth tip surface 3 with the point contact or the line contact shorter than the total tooth width, and thereafter, gradually shifts to the line contact so that the length of contact line thereof is sequentially increased as the line contact moves from the tooth tip side (3) toward the tooth root side (4). In this case, the contact at the mating time of the opposite teeth 1 and 2 does not start firstly with the line contact of the total tooth width at the tooth tip portion, but starts with the point contact or the line contact shorter than the total tooth width. Then, the point contact gradually shifts to the line contact shorter than the total tooth width, and thereafter, further gradually shifts to the larger line contact within the range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed.

Incidentally, in FIG. 13, the curve 21 which modifies, with the modification amount p, the tooth thickness of the tooth tip surface 3 to be thinned on the side of the other end portion 6 in the tooth width direction in the one tooth flank 7, is made linear. However, the shape of the curve 21 is not limited to the above, and may be formed in a curved shape.

Figure 15A:
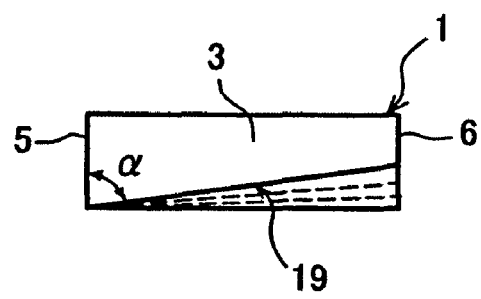
FIGS. 15A and 15B are explanatory diagrams showing modified examples of the profile of the tooth in the fourth embodiment shown in FIG. 13.
Figure 15B:
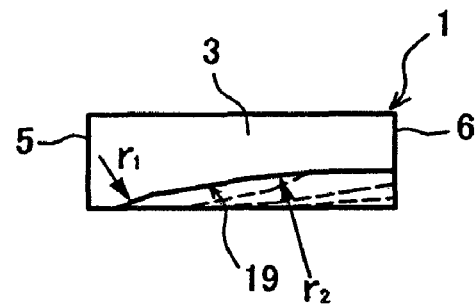

FIGS. 15A and 15B are explanatory diagrams showing modified examples of the shape of the tooth 1 of the fourth embodiment shown in FIG. 13. Each of these modified examples, similarly to FIG. 14, shows the planar vision shape of the curved surface 19 viewed from above the tooth tip surface 3 of the tooth 1. In FIG. 15A, the involute curve 20 on the one end portion 5 side and the curve 21 on the other end portion 6 side, in the tooth width direction of the one tooth flank 7 shown in FIG. 13, are connected to each other with parallel lines. At this time, the curved surface 19 viewed from above the tooth tip surface 3 of the tooth 1 is planar, and an angle α at which the one end portion 5 in the tooth width direction and the curved surface 19 intersect with each other, is sequentially increased from the tooth tip through the tooth root side. In this case, it becomes easy to perform the processing and finishing of the tooth flank 7 of the tooth 1.

Further, in FIG. 15B, the involute curve 20 on the one end portion 5 side and the curve 21 on the other end portion 6 side, in the tooth width direction of the one tooth flank 7 shown in FIG. 13, are smoothly connected to each other with parallel lines 22 each of which curvature direction is reversed halfway, to thereby form the curved surface shape. At this time, the planar vision shape of the curved surface 19 viewed from above the tooth tip surface 3 of the tooth 1 has a shape obtained by connecting two curved surfaces each of which curvature direction is reversed halfway, and provided that a curvature radius of the one curved surface in the tooth width direction is $r_1$ and a curvature radius of the other curved surface in the tooth width direction is $r_2$, each of the curvature radiuses $r_1$ and $r_2$ is sequentially increased from the tooth tip through the tooth root 4 side.

Figure 16:
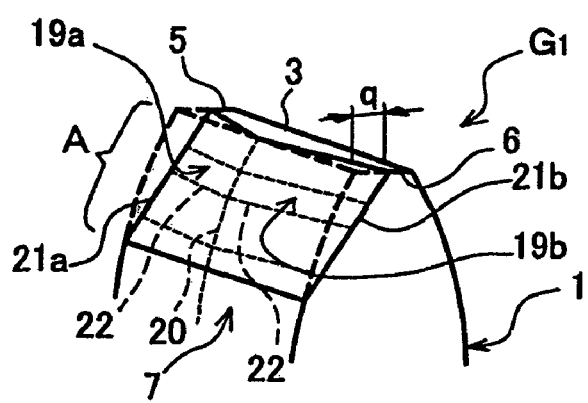
FIG. 16 is a main part perspective view showing a fifth embodiment of the profile of the tooth of the one gear.
Figure 17:
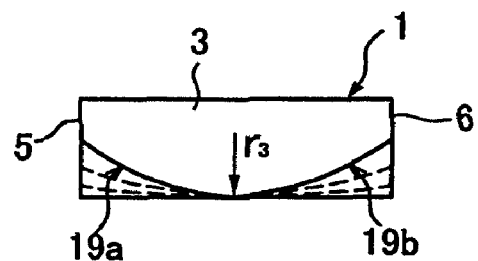
FIG. 17 is an explanatory diagram showing a planar vision shape of a curved surface in one of tooth flanks of the tooth shown in FIG. 16 viewed from above a tooth tip surface thereof.

FIG. 16 is a main part perspective view showing a fifth embodiment of the shape of the tooth 1 of the gear $G_1$. In this embodiment, for the predetermined region A in the tooth flank, curved surfaces 19a and 19b each of which gradually decreases the tooth thickness are formed on predetermined places in the tooth width direction of the one tooth flank 7, in this case, from the center portion toward both of the end face sides. Namely, each of the curved surfaces 19a and 19b is formed in a convex curved surface, and smoothly connects with parallel curves 22 between the involute curve 20 on the center portion in the tooth width direction of the one tooth flank 7 and curves 21a and 21b which respectively modify with a modification amount q the tooth thickness of the tooth tip surface 3 on the one end portion 5 side and the other end portion 6 side. At this time, planar vision shape of the curved surface 19a and 19b viewed from above the tooth tip surface 3 of the tooth 1 in FIG. 16 is shown in FIG. 17, in which a curvature radius $r_3$ in the tooth width direction obtained by connecting the two curved surfaces 19a and 19b is sequentially increased from the tooth tip through the tooth root 4 side.

According to such a shape, the configuration of the predetermined region A in at least the one tooth flank 7 of each tooth 1 can be formed such that the mating with the teeth (2) of the mating gear ($G_2$) starts from the center portion in the tooth width direction of the tooth tip surface 3 with the point contact or the line contact shorter than the total tooth width, and thereafter, gradually shifts to the line contact so that the length of contact line thereof is sequentially increased as the line contact moves from the tooth tip side (3) toward the tooth root side (4). In this case, the contact at the mating time of the opposite teeth 1 and 2 does not start firstly with the line contact of the total tooth width at the tooth tip portion, but starts with the point contact or the line contact shorter than the total tooth width. Then, the point contact gradually shifts to the line contact shorter than the total tooth width, and thereafter, further gradually shifts to the larger line contact within the range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed.

Incidentally, in FIG. 16, the curves 21a and 21b which respectively modify with the modification amount q the tooth thickness of the tooth tip surface 3 to be thinned on the side of the one end portion 5 and the side of the other end portion 6 in the tooth width direction of the one tooth flank 7, are made linear. However, the shape of the curves 21a and 21b is not limited to the above, and may be formed in a curved shape.

Figure 18A:
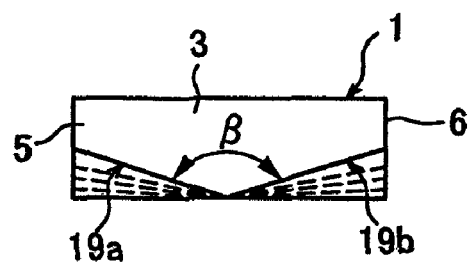
FIGS. 18A and 18B are explanatory diagrams showing modified examples of the profile of the tooth in the fifth embodiment shown in FIG. 16.
Figure 18B:
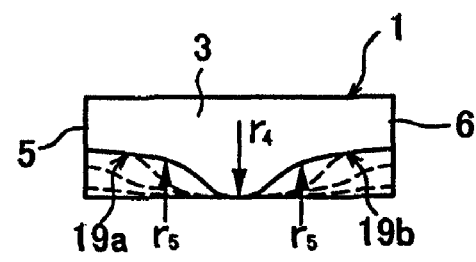

FIGS. 18A and 18B are explanatory diagrams showing modified examples of the shape of the tooth 1 of the fifth embodiment shown in FIG. 16. These modified examples, similarly to FIG. 17, show the planar vision shapes of the curved surfaces 19a and 19b viewed from above the tooth tip surface 3 of the tooth 1. In FIG. 18A, the involute curve 20 on the center portion in the tooth width direction of the one tooth flank 7 shown in FIG. 16, and the curves 21a and 21b on the side of the one end portion 5 and the side of the other end portion 6, are connected to each other with parallel lines. At this time, the curved surfaces 19a and 19b viewed from above the tooth tip surface 3 of the tooth 1 are planar, and an angle β at which the curved surfaces 19a and 19b intersect with each other, is sequentially increased from the side of the tooth tip through the tooth root 4. In this case, it becomes easy to perform the processing and finishing of the tooth flank 7 of the tooth 1.

Further, in FIG. 18B, the involute curve 20 on the center portion in the tooth width direction of the one tooth flank 7 shown in FIG. 16, and the curves 21a and 21b on the one end portion 5 side and the other end portion 6 side, are smoothly connected to each other with the parallel lines 22 each of which curvature direction is reversed halfway, to thereby form the curved surface shapes. At this time, the planar vision shape of the curved surfaces 19a and 19b viewed from above the tooth tip surface 3 of the tooth 1 is in a shape obtained by connecting two curved surfaces each of which curvature direction is reverted halfway, and provided that a curvature radius in the tooth width direction of the curved surface on the center portion is $r_4$ and a curvature radius in the tooth width direction of each of the curved surfaces on both sides is $r_5$, the curvature radiuses $r_4$ and $r_5$ are sequentially increased from the tooth tip through the side of the tooth root 4.

Figure 19A:
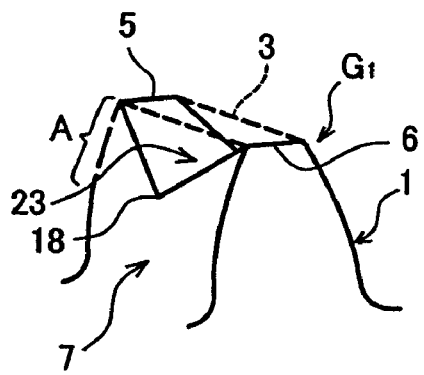
FIGS. 19A through 19C are main part perspective views showing a sixth embodiment of the profile of the tooth of the one gear.
Figure 19B:
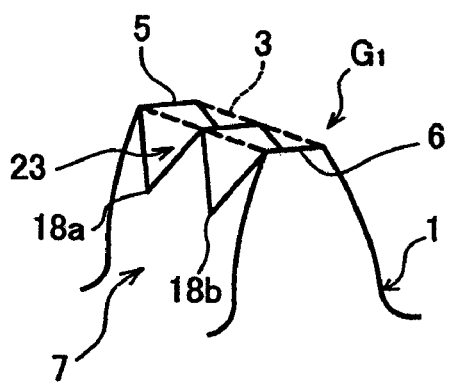
Figure 19C:
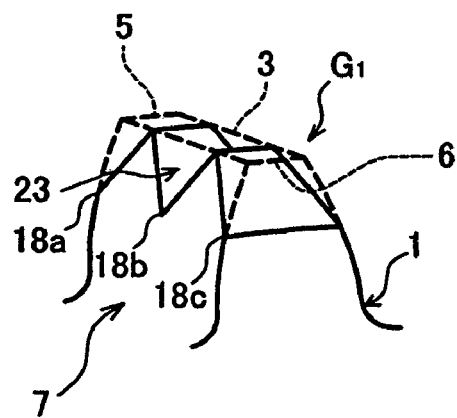

FIGS. 19A through 19C are main part perspective views showing a sixth embodiment of the shape of the tooth 1 of the gear $G_1$. In this embodiment, as shown in FIG. 19A, for the predetermined region A in the tooth flank, a triangular notched concave portion 23 is formed, by chipping off from the one tooth flank 7 a triangular shape which extends from the site 18 of the one place on the one tooth flank 7 to both of the sides of the end portion 5 and 6 of the tooth tip surface 3 and also runs through to the other tooth flank. Further, in FIG. 19B, the triangular notched concave portion 23 is formed in plural places, by chipping off from the one tooth flank 7 triangular shapes which extend from the two sites 18a and 18b on the one tooth flank 7 to both of the end portion 5 and 6 sides of the tooth tip surface 3 and also run through to the other tooth flank. Furthermore, in FIG. 19C, the triangular notched concave portion 23 is formed in plural places, by chipping off from the one tooth flank 7 triangular shapes from the three sites 18a, 18b and 18c on the one tooth flank 7 to both sides of the end portion 5 and 6 of the tooth tip surface 3 and also run through to the other tooth flank.

Figure 20A:
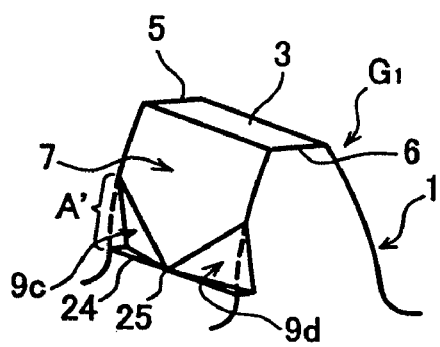
FIGS. 20A through 20D are main part perspective views showing a seventh embodiment of the profile of the tooth of the one gear.

FIGS. 20A through 20D are perspective views showing a main part of a seventh embodiment of the shape of the tooth 1 of the gear $G_1$. In this embodiment, as shown in FIG. 20A, a predetermined region A' in at least the one tooth flank 7 of each tooth 1 is formed in a configuration such that the mating with the teeth (2) of the mating gear ($G_2$) starts from at least one place in the tooth width direction on a crossing 24 of the tooth flank 7 and a tooth root surface with the point contact or the line contact shorter than the total tooth width, and thereafter, gradually shifts to the line contact so that the length of contact line thereof is sequentially increased as the line contact moves from a tooth root side (24) toward the tooth tip side (3). Namely, chamfered portions 9c and 9d are formed, by cutting away from the one tooth flank 7 predetermined places in the tooth width direction on the crossing 24 of the one tooth flank 7 and the tooth root side, in this case from a center portion 25 toward the involute curve portions on the end face sides on both sides According to such a shape, mainly in the gear on a driving side, the contact at the mating time of the opposite teeth 1 and 2 does not start firstly with the line contact of the total tooth width at a tooth root portion, but starts with the point contact or the line contact shorter than the total tooth width. Then, the point contact gradually shifts to the line contact shorter than the total tooth width, and thereafter, further gradually shifts to the larger line contact within the range of the total tooth width. Further, the line contact shorter than the total tooth width then gradually shifts to the larger line contact within the range of the total tooth width. As a result, the contact to the teeth (2) of the mating gear ($G_2$) is softened and therefore, the shock can be absorbed.

Figure 20B:
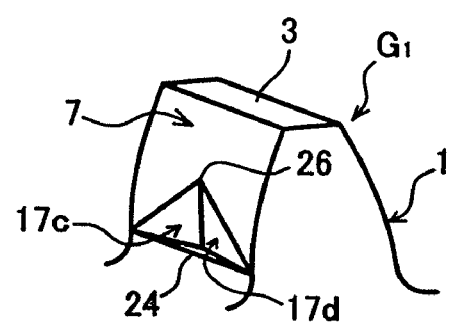
Figure 20C:
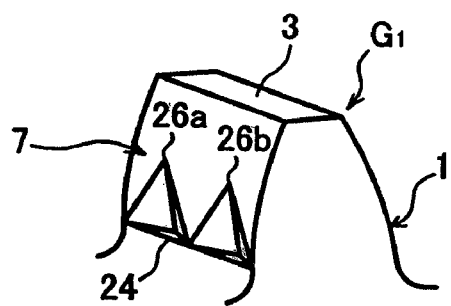
Figure 20D:
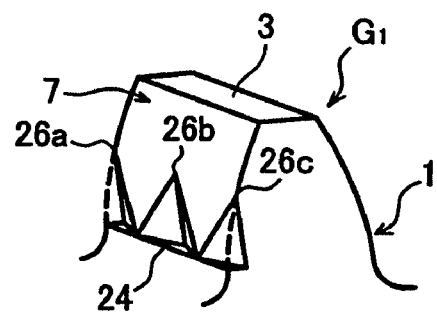

Further, FIGS. 20B through 20D are partial perspective views showing a main part of the respective modified examples of the shape of the tooth 1 of the gear $G_1$ in the seventh embodiment. For these modified examples, in FIG. 20B, chipped portions 17c and 17d are formed, by chipping off from the tooth flank 7 the triangular inclined planes which extend from a site 26 of the one place on the one tooth flank 7 to both of the end face sides toward the crossing 24 of the tooth flank 7 and the tooth root surface. Further, in FIG. 20C, the chipped portions 17c and 17d are formed on plural places by chipping off from the tooth flank 7 the triangular inclined planes which extend from two sites 26a and 26b on the one tooth flank 7 to both of the end face sides toward the crossing 24 of the tooth flank 7 and the tooth root surface. Furthermore, in FIG. 20D, the chipped portions 17c and 17d are formed on plural places by chipping off from the tooth flank 7 the triangular inclined planes which extend from three sites 26a, 26b and 26c on the one tooth flank 7 to both of the end face sides toward the crossing 24 of the tooth flank 7 and the tooth root surface.

Figure 21A:
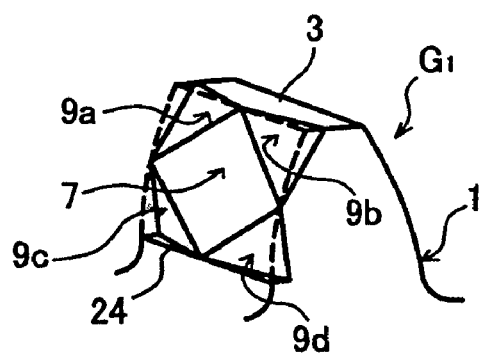
FIGS. 21A through 21D are main part perspective views showing an eighth embodiment of the profile of the tooth of the one gear.
Figure 21B:
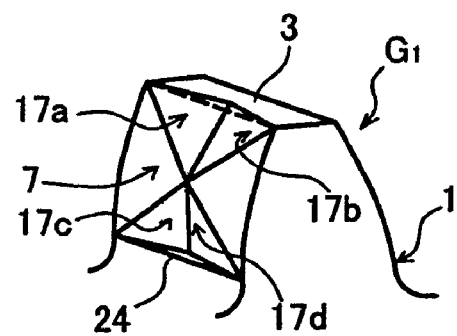
Figure 21C:
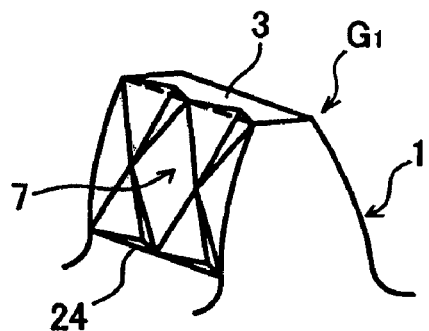
Figure 21D:
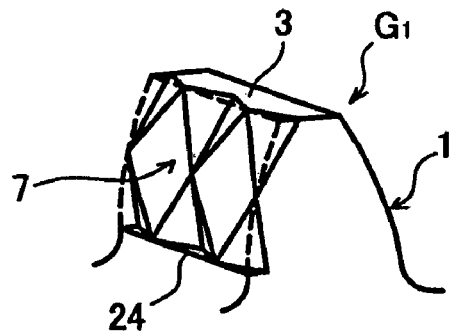

FIGS. 21A through 21D are partial perspective views showing a main part of an eighth embodiment of the shape of the tooth 1 of the gear $G_1$. In this embodiment, the modification of the tooth profile on the tooth tip side shown in FIG. 6 is basically combined with the modification of the tooth profile on the tooth root side shown in FIG. 20A. To be specific, FIG. 21A shows the combination of the embodiment shown in FIG. 6 and the embodiment shown in FIG. 20A, and FIG. 21B shows the combination of the embodiment shown in FIG. 9 and the embodiment shown in FIG. 20B. Further, FIG. 21C shows the combination of the embodiment shown in FIG. 11A and the embodiment shown in FIG. 20C, and FIG. 21D shows the combination of the embodiment shown in FIG. 11B and the embodiment shown in FIG. 20D.

Figure 22A:
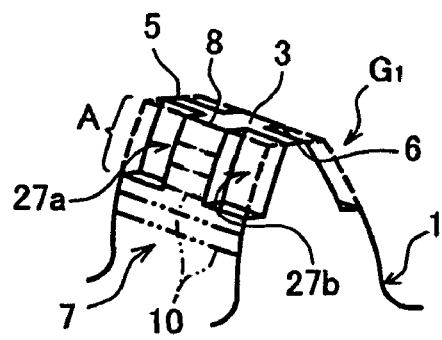
FIGS. 22A through 22D are main part perspective views showing a ninth embodiment of the profile of the tooth of the one gear.

FIGS. 22A through 22D are partial perspective views showing a main part of a ninth embodiment of the shape of the tooth 1 of the gear $G_1$. For this embodiment, as shown in FIG. 22A, the configuration of the predetermined region A in at least the one tooth flank 7 of each tooth 1 is formed such that the mating with the teeth (2) of the mating gear ($G_2$) starts from at least one place in the tooth width direction on the crossing 8 of the tooth flank 7 and the tooth tip surface 3 with the point contact or the line contact shorter than the total tooth width, and thereafter, rapidly or in stepwise shifts to the line contact of the total tooth width from the tooth tip side toward the tooth root side so that the length of contact line 10 thereof is increased. Namely, rectangular chipped portions 27a and 27b are formed, by chipping off from the one tooth flank 7 predetermined places in the tooth width direction on the crossing 8 of the one tooth flank 7 and the tooth tip surface 3, in rectangular concave stepped portions, in this case, from the center portion toward the involute curve portions on the end face sides on both sides.

According to such a shape, mainly in the gear on the driven side, the contact at the mating time of the opposite teeth 1 and 2 does not start firstly with the line contact on the tooth flank 7, but starts with the point contact or the line contact shorter than the total tooth width. Then, the point contact rapidly or in stepwise shifts to the line contact shorter than the total tooth width, and thereafter, further rapidly or in stepwise shifts to the larger line contact within the range of the total tooth width. Further, the line contact shorter than the total tooth width then rapidly or in stepwise shifts to the larger line contact within the range of the total tooth width. As a result, the contact to the teeth (2) of the mating gear ($G_2$) is softened and therefore, the shock can be absorbed.

Figure 22B:
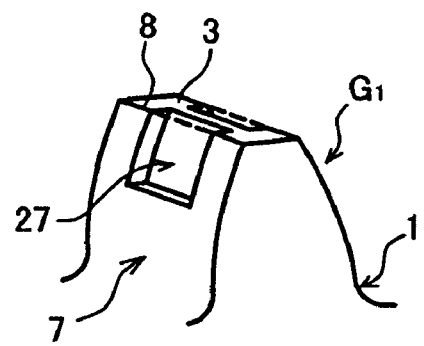
Figure 22C:
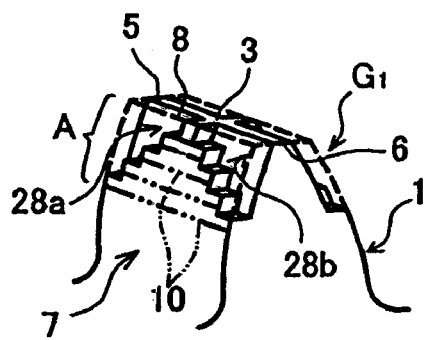
Figure 22D:
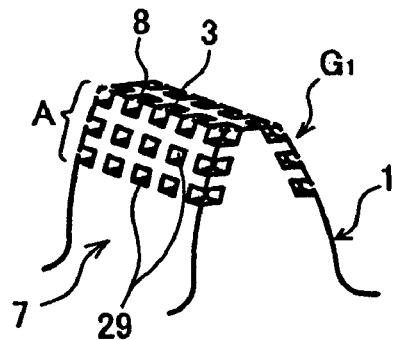

Further, FIGS. 22B through 22D are partial perspective views showing a main part of the respective modified examples of the shape of the tooth 1 of the gear $G_1$ in the ninth embodiment. For these modified examples, in FIG. 22B, a rectangular chipped portion 27 is formed, by chipping off from the tooth flank 7 the center portion in the tooth width direction on the crossing 8 of the one tooth flank 7 and the tooth tip surface 3 in a rectangular concave stepped portion. Further, in FIG. 22C, stepped chipped portions 28a and 28b are formed, by chipping off from the tooth flank 7 predetermined places in the tooth width direction on the crossing 8 of the one tooth flank 7 and the tooth tip surface 3 in stair concave stepped portions, in this case, from the center portion toward the involute curve portions on the end face sides on both sides. In this case, the mating with the teeth of the mating gear starts from at least one place in the tooth width direction on the crossing 8 of the tooth flank 7 and the tooth tip surface 3 with the point contact or the line contact shorter than the total tooth width, and thereafter, in stepwise shifts to the line contact of the total tooth width from the tooth tip side toward the tooth root side so that the length of contact line 10 thereof is increased. Furthermore, in FIG. 22D, in the predetermined region A in the one tooth flank 7 of each tooth 1, a plurality of recesses 29 of small diameter (for example, rectangular recesses) is intermittently formed in parallel to the crossing 8 of the tooth flank 7 and the tooth tip surface 3, toward the involute curve portions on the end face sides on both sides, and also, a plurality of rows of this plurality of recesses 29 is formed at a small interval. In this case, in a range of the predetermined region A in the one tooth flank 7, the mating with the teeth of the mating gear starts with the line contact shorter than the total tooth width, and thereafter, rapidly shifts to the line contact of the total tooth width so that the length of contact line thereof is increased.

Figure 23A:
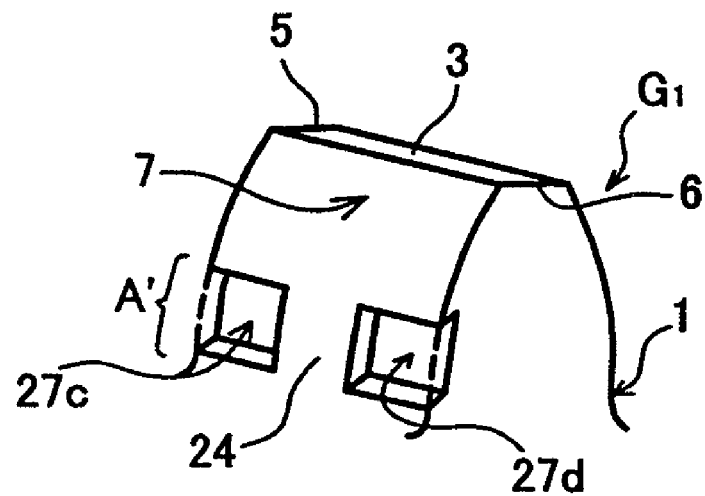
FIGS. 23A and 23B are main part perspective views showing a tenth embodiment of the profile of the tooth of the one gear.
Figure 23B:
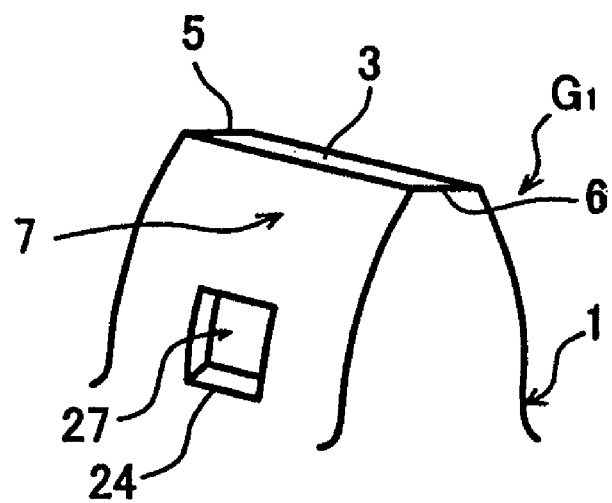

FIGS. 23A and 23B are partial perspective views showing a main part of the tenth embodiment of the shape of the tooth 1 of the gear $G_1$. For this embodiment, as shown in FIG. 23A, the configuration of the predetermined region A' in at least the one tooth flank 7 of each tooth 1 is formed such that the mating with the teeth (2) of the mating gear ($G_2$) starts from at least one place in the tooth width direction on the crossing 24 of the tooth flank 7 and the tooth root surface with the point contact or the line contact shorter than the total tooth width, and thereafter, rapidly or in stepwise shifts to the line contact of the total tooth width from the tooth root side (24) toward the tooth tip side (3) so that the length of contact line thereof is increased. Namely, rectangular chipped portions 27c and 27d are formed, by chipping off from the one tooth flank 7 predetermined places in the tooth width direction on the crossing 24 of the one tooth flank 7 and the tooth root surface in rectangular concave stepped portions, in this case, from the center portion toward the involute curve portions on the end face sides on both sides.

According to such a shape, mainly in the gear on the driving side, the contact at the mating time of the opposite teeth 1 and 2 does not start firstly with the line contact of the total tooth width at the tooth root portion, but starts with the point contact or the line contact shorter than the total tooth width. Then, the point contact rapidly or in stepwise shifts to the line contact shorter than the total tooth width, and thereafter, further rapidly or in stepwise shifts to the larger line contact within the range of the total tooth width. Further, the line contact shorter than the total tooth width then rapidly or in stepwise shifts to the larger line contact within the range of the total tooth width. As a result, the contact to the teeth (2) of the mating gear ($G_2$) is softened and therefore, the shock can be absorbed.

Further, FIG. 23B is a perspective view showing a main part of the modified example of the shape of the tooth 1 of the gear $G_1$ in the tenth embodiment. In this modified example, the rectangular chipped portion 27 is formed, by chipping off from the tooth flank 7 a predetermined place in the tooth width direction on the crossing 24 of the one tooth flank 7 and the tooth root surface in the rectangular concave stepped portion, in this case, at the center portion. Note, although omitted in FIG. 23, the stepped chipped portions 28a and 28b shown in FIG. 22C, or the plurality of small diameter recesses 29 shown in FIG. 22D may be formed from the tooth root surface side (24) of the tooth flank 7 toward the tooth tip surface side (3) thereof.

In the above description, in the predetermined region in the tooth flank of each tooth 1, the chamfered portion 9 (refer to FIG. 3), the chipped portions 17a and 17b (refer to FIG. 9), the curved surface 19 (refer to FIG. 13), the rectangular chipped portions 27a and 27b and the stepped chipped portions 28a and 28b (refer to FIGS. 22A through 22D) are formed on only the one tooth flank 7. However, the present invention is not limited to the above, and the chamfered portion 9, the chipped portions 17a and 17b, the curved surface 19, the rectangular chipped portions 27a and 27b, and the stepped chipped portions 28a and 28b may be formed on both of the tooth flanks of each tooth 1. In this case, the above described chamfered portion is not limited to the inclined plane, and may be formed in a convex curved surface or a concave curved surface.

Next, there will be described a shape of the other gear $G_2$ constituting the gearing apparatus shown in FIG. 1. This gear $G_2$ is provided with the plurality of teeth 2, 2, . . . , and these teeth 2 are mated with the teeth 1 of the mating gear $G_1$, to thereby transmit the rotational motion. The tooth 2 is formed in a shape exactly same as the shape of the tooth 1 of the one gear $G_1$ shown in FIGS. 3 through 23A and 23B. Further, a predetermined region in a tooth flank of each tooth 2 is a region on a tooth tip side or a tooth root side from the vicinity of a branching point between the (n+1) teeth mating and the n teeth mating (n is integer of one or more) at the mating time with the teeth 1 of the mating gear $G_1$. Incidentally, for the shape of the other gear $G_2$, similarly to the above, the chamfered portion 9, the chipped portions 17a and 17b, the curved surface 19, the rectangular chipped portions 27a and 27b, and the stepped chipped portions 28a and 28b may be formed on both tooth flanks of each tooth 2.

FIGS. 24A through 24C are cross section explanatory diagrams showing combination states of the one gear $G_1$ and the other gear $G_2$ in the gearing apparatus configured as described above. In FIG. 24A, for the one gear $G_1$ in the pair of gears $G_1$ and $G_2$, on the tooth flank of each tooth 1 shown in FIG. 3, the chamfered portion 9 is formed, by cutting away from the one tooth flank 7 the triangular inclined plane from the corner portion on the one end portion 5 side in the tooth width direction of the tooth tip surface 3 toward the involute curve portion on the other end portion 6 side. In this case, the other gear $G_2$ is formed to have the tooth profile of the standard gear.

In FIG. 24B, for the pair of gears $G_1$ and $G_2$, on the tooth flank of each of teeth 1 and 2, each of the chamfered portions 9, 9 is formed, by cutting away from the one tooth flank 7 shown in FIG. 3 the triangular inclined plane from the corner portion on the one end portion 5 side in the tooth width direction of the tooth tip surface 3, toward the involute curve portion on the other end portion 6 side. In this case, an opposed state of the inclined planes of the chamfered portions 9, 9 of the one gear $G_1$ and the other gear $G_2$ is made to be line symmetrical to the boundary line.

In FIG. 24C, also for the pair of gears $G_1$ and $G_2$, on the tooth flank of each of teeth 1 and 2, each of the chamfered portions 9, 9 is formed, by cutting away from the one tooth flank 7 shown in FIG. 3 the triangular inclined plane from the corner portion on the one end portion 5 side in the tooth width direction of the tooth tip surface 3, toward the involute curve portion on the other end portion 6 side. In this case, the opposed state of the inclined planes of the chamfered portions 9, 9 of the one gear $G_1$ and the other gear $G_2$ is made to be point symmetrical to the boundary line.

Incidentally, in FIGS. 24A through 24C, there has been shown the case where the teeth 1 of the gear shown in FIG. 3 is used to configure the gearing apparatus. However, the present invention is not limited thereto, and the gearing apparatus can be configured by using in any one of all of the above described gear teeth 1. Further, in the present invention, materials for each of the pair of gears $G_1$ and $G_2$ may be a metal material or a resin material. In the case of resin gears $G_1$ and $G_2$, the production thereof can be made by the injection molding.

We claim:
1. A gear comprising:
a plurality of teeth to be mated with teeth of another engaged gear;
wherein each tooth of the plurality of teeth comprises a first and second tooth flank, a tooth tip surface, and a tooth root, wherein the first and second tooth flanks are symmetric and form an involute curve, wherein a width of the tooth tip surface is the same as a width at the tooth root, wherein a height of the tooth from the tooth tip surface to the tooth root is constant, and
wherein the first tooth flank comprises a predetermined region configured to gradually contact a tooth of the another engaged gear, wherein the predetermined region comprises a first inclined plane and a second inclined plane, wherein each of the first and second inclined planes gradually decrease a tooth thickness from a center portion of the first tooth flank along a tooth width direction to a first and second end portion, respectively, without decreasing the tooth thickness at the center portion, the tooth thickness at the center portion being along the involute curve.
2. The gear according to claim 1, wherein the first inclined plane and the second inclined plane form an angle which is sequentially increased from the tooth tip surface toward the tooth root.
3. A gearing apparatus for transmitting a rotational motion from one shaft to another shaft by engaging a first gear with a second gear, the first gear comprising:
a plurality of teeth configured to be mated with a plurality of teeth of the second gear,
wherein each tooth of the plurality of teeth comprises a first and second tooth flank, a tooth tip surface, and a tooth root, wherein the first and second tooth flanks are symmetric and form an involute curve, wherein a width of the tooth tip surface is the same as a width at the tooth root, wherein a height of the tooth from the tooth tip surface to the tooth root is constant,
wherein the first tooth flank comprises a predetermined region configured to gradually contact a tooth of the second gear, wherein the predetermined region comprises a first inclined plane and a second inclined plane, wherein each of the first and second inclined planes gradually decrease a tooth thickness from a center portion of the first tooth flank along a tooth width direction to a first and second end portion, respectively, without decreasing the tooth thickness at the center portion, the tooth thickness at the center portion being along the involute curve.
wherein the predetermined region is further configured such that the mating of the plurality of teeth of the first gear with the plurality of teeth of the second gear starts with either a point contact or a first line contact, and
wherein the predetermined region is further configured such that the mating of the plurality of teeth of the first gear with the plurality of teeth of the second gear gradually shifts to a second line contact from the point contact or the first line contact, whereby a length of the second line contact is continuously increased as the second line contact moves from the tooth tip surface toward the tooth root.
4. The gearing apparatus according to claim 3, wherein the first inclined plane and the second inclined plane form an angle which is sequentially increased from the tooth tip surface toward the tooth root.

* * * * *